United States Patent
Matsumura et al.

(10) Patent No.: US 11,356,228 B2
(45) Date of Patent: Jun. 7, 2022

(54) USER TERMINAL AND RADIO COMMUNICATION METHOD

(71) Applicant: NTT DOCOMO, INC., Tokyo (JP)

(72) Inventors: Yuki Matsumura, Tokyo (JP); Kazuaki Takeda, Tokyo (JP); Kazuki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 66 days.

(21) Appl. No.: 16/765,660

(22) PCT Filed: Nov. 24, 2017

(86) PCT No.: PCT/JP2017/042296
§ 371 (c)(1),
(2) Date: May 20, 2020

(87) PCT Pub. No.: WO2019/102599
PCT Pub. Date: May 31, 2019

(65) Prior Publication Data
US 2020/0304274 A1 Sep. 24, 2020

(51) Int. Cl.
*H04L 5/00* (2006.01)
*H04B 1/7136* (2011.01)
*H04W 72/04* (2009.01)

(52) U.S. Cl.
CPC ......... *H04L 5/0092* (2013.01); *H04B 1/7136* (2013.01); *H04L 5/0098* (2013.01); *H04W 72/0413* (2013.01); *H04W 72/0446* (2013.01)

(58) Field of Classification Search
CPC ..... H04L 5/0098; H04L 5/001; H04L 5/0092; H04L 27/2602; H04L 5/0053; H04W 72/0413; H04W 72/0446; H04W 72/0453; H04B 1/7136; H04B 1/7143
See application file for complete search history.

(56) References Cited

U.S. PATENT DOCUMENTS

| 2019/0104516 A1* | 4/2019 | Oh ........................ H04L 5/0053 |
| 2020/0245360 A1* | 7/2020 | Xu ........................ H04W 72/04 |
| 2020/0275446 A1* | 8/2020 | Kim ....................... H04W 72/02 |
| 2020/0314869 A1* | 10/2020 | Xu ........................ H04W 72/12 |

(Continued)

OTHER PUBLICATIONS

3GPP TS 36.300 V8.12.0 "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)" Mar. 2010 (149 pages).

(Continued)

*Primary Examiner* — Brian D Nguyen
(74) *Attorney, Agent, or Firm* — Osha Bergman Watanabe & Burton LLP

(57) ABSTRACT

A user terminal according to one aspect of the present disclosure includes: a transmission section that transmits an uplink control channel over multiple slots; and a control section that, when changing an active Bandwidth Part (BWP) during the transmission of the uplink control channel, controls the transmission of the uplink control channel after the BWP changing. According to the one aspect of the present disclosure, it is possible to prevent a communication throughput from lowering even when a BWP is switched.

4 Claims, 21 Drawing Sheets

(56) References Cited

U.S. PATENT DOCUMENTS

2021/0144062 A1* 5/2021 Jin .................. H04W 48/18
2021/0176792 A1* 6/2021 Xu .................. H04W 72/04

OTHER PUBLICATIONS

3GPP TSG RAN WG1 Meeting 91; R1-1719926 "Remaining aspects of long PUCCH over multiple slots" LG Electronics; Reno, USA; Nov. 27-Dec. 1, 2017 (5 pages).

3GPP TSG RAN WG1 Meeting 91; R1-1720818 "Long-PUCCH over multiple slots" NTT DOCOMO, Inc.; Reno, USA; Nov. 27-Dec. 1, 2017 (4 pages).

International Search Report issued in International Application No. PCT/JP2017/042296, dated Feb. 27, 2018 (4 pages).

Written Opinion issued in International Application No. PCT/JP2017/042296; dated Feb. 27, 2018 (4 pages).

3GPP TSG RAN WG1 Meeting 90bis; R1-1717655 "Resource Allocation for PUCCH transmission" Samsung; Prague, CZ; Oct. 9-13, 2017 (4 pages).

3GPP TSG RAN WG1 NR Ad-Hoc#2; R1-1710322 "Discussion on UL control with ultra-reliability" LG Electronics; Quingdao, P.R. China; Jun. 27-30, 2017 (3 pages).

3GPP TSG-RAN WG4-NR Meeting #2; R4-1706828 "Views on UL non-contiguous allocation" NTT DOCOMO, Inc.; Quingdao, China; Jun. 27-29, 2017 (4 pages).

3GPP TSG-RAN WG2 Meeting #100; R2-1713077 "Handle ongoing HARQ process when BWP switching occurs" MediaTek Inc.; Reno, Nevada, USA; Nov. 27-Dec. 1, 2017 (2 pages).

3GPP TSG-RAN WG2 Meeting #100; R2-1712433 "Consideration on the autonomous BWP switch" ZTE Corporation; Reno, USA; Nov. 27-Dec. 1, 2017 (5 pages).

3GPP TSG-RAN WG2 #99-Bis; R2-1710341 "On LCH-to-SR-configuration mapping within the multi-BWP framework" Samsung Electronics R&D Institute UK; Prague, Czech Republic; Oct. 9-13, 2017 (4 pages).

Extended European Search Report issued in European Application No. 17932609.5, dated Jun. 1, 2021 (10 pages).

Office Action issued in Japanese Application No. 2019-556062; dated Jan. 25, 2022 (6 pages).

* cited by examiner

| BWP | M |
|---|---|
| ~10 MHz | 1 |
| 10~20 MHz | 2 |
| 20~40 MHz | 4 |
| 40~80 MHz | 8 |
| ... | ... |

FIG. 9

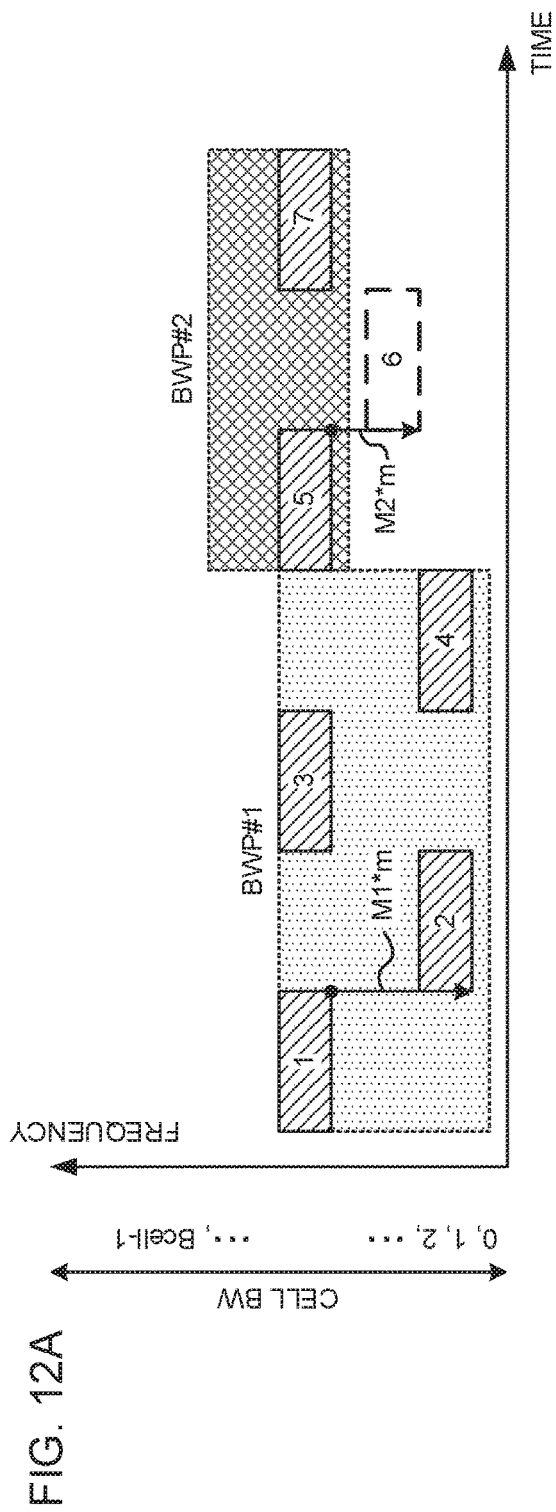
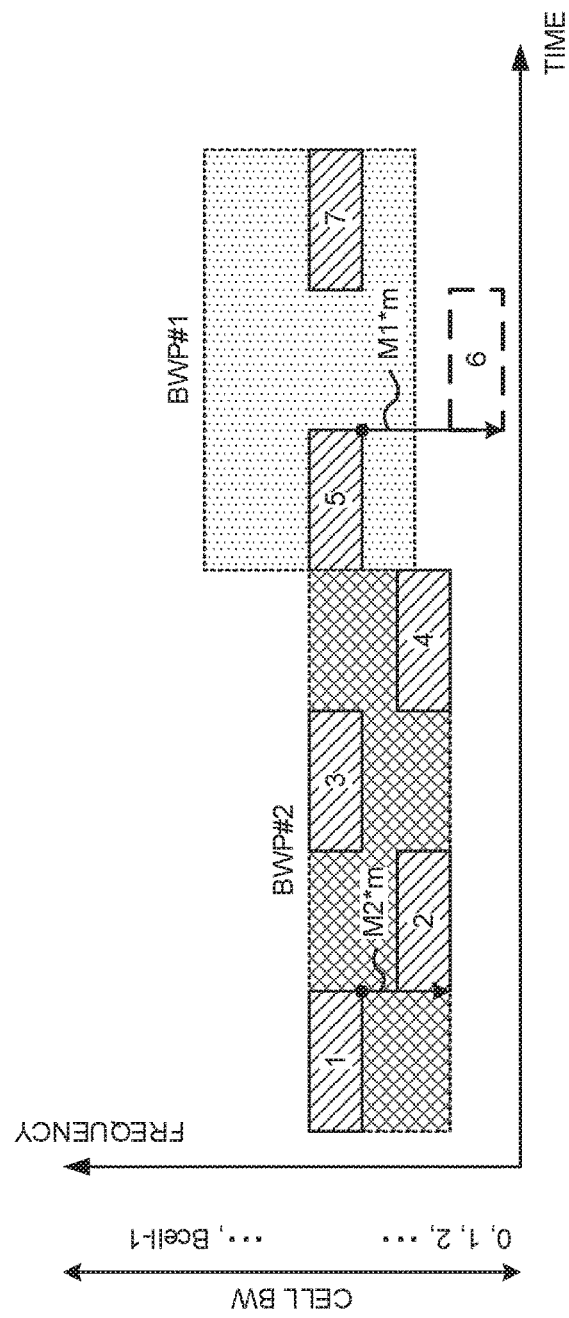
FIG. 12A
FIG. 12B

FIG. 14A

| GIVEN FIELD VALUE IN DCI | PUCCH RESOURCE SET |
|---|---|
| 00 | PUCCH RESOURCE SET #0 |
| 01 | PUCCH RESOURCE SET #1 |
| 10 | PUCCH RESOURCE SET #2 |
| 11 | PUCCH RESOURCE SET #3 |

FIG. 14B

PARAMETER GROUP INCLUDED IN EACH PUCCH RESOURCE SET

| |
|---|
| STARTING SYMBOL |
| NUMBER OF SYMBOLS IN SLOT |
| INDEX FOR IDENTIFYING FREQUENCY RESOURCE OF FIRST HOP |
| NUMBER OF PRBS |
| WHETHER FREQUENCY HOPPING IS ENABLED OR IS NOT ENABLED |
| INFORMATION RELATED TO FREQUENCY RESOURCES OF SECOND AND SUBSEQUENT HOPS |
| FREQUENCY HOPPING MODE |

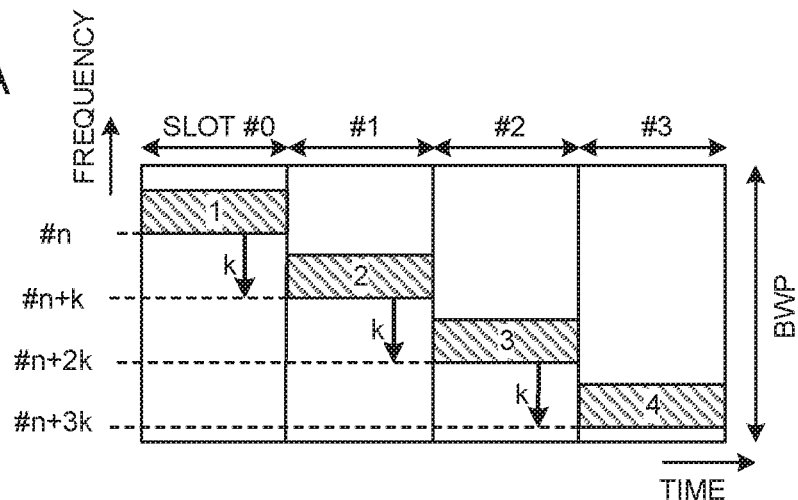
FIG. 15A
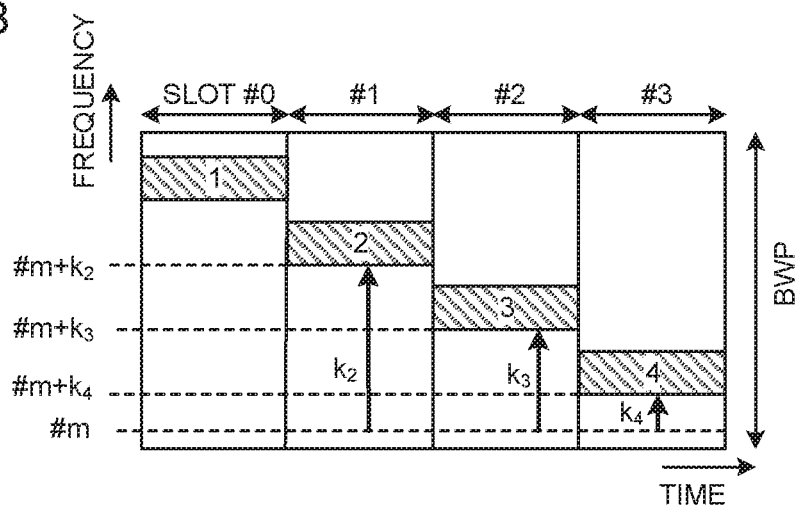
FIG. 15B
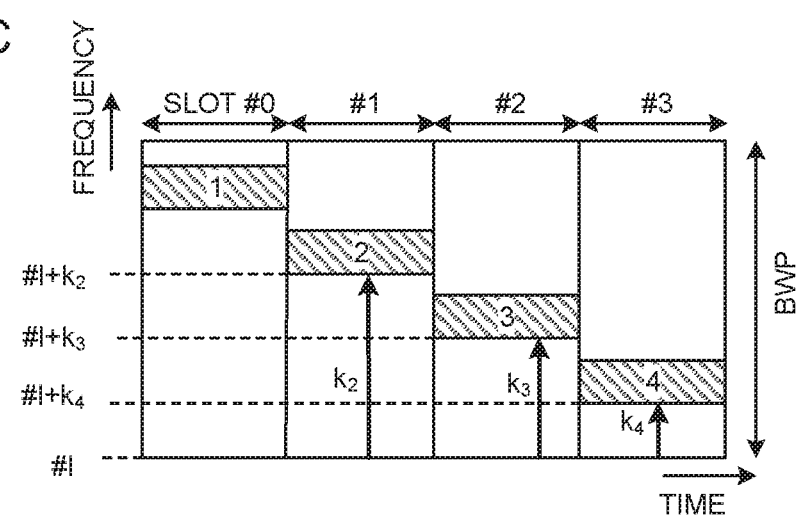
FIG. 15C
 PUCCH

USER TERMINAL AND RADIO COMMUNICATION METHOD

TECHNICAL FIELD

The present disclosure relates to a user terminal and a radio communication method of a next-generation mobile communication system.

BACKGROUND ART

In Universal Mobile Telecommunications System (UMTS) networks, for the purpose of higher data rates and lower latency, Long Term Evolution (LTE) has been specified (Non-Patent Literature 1). Furthermore, for a larger capacity and higher sophistication than those of LTE (LTE Rel. 8 and 9), LTE-Advanced (LTE-A and LTE Rel. 10, 11, 12 and 13) has been specified.

LTE successor systems (also referred to as, for example, Future Radio Access (FRA), the 5th generation mobile communication system (5G), 5G+ (plus), New Radio (NR), New radio access (NX), Future generation radio access (FX) or LTE Rel. 14, 15 or subsequent releases) have been also studied.

According to legacy LTE systems (e.g., LTE Rel. 8 to 13), a user terminal (UE: User Equipment) transmits Uplink Control Information (UCI) by using, for example, a UL control channel (e.g., PUCCH: Physical Uplink Control Channel).

The UCI may include, for example, retransmission control information (also referred to as HARQ-ACK, ACK/NACK and A/N) for DL data, a Scheduling Request (SR) and CSI (e.g., Periodic CSI (P-CSI) or Aperiodic CSI (A-CSI)).

CITATION LIST

Non-Patent Literature

Non-Patent Literature 1: 3GPP TS 36.300 V8.12.0 "Evolved. Universal Terrestrial Radio Access (E-UTRA) and Evolved Universal Terrestrial Radio Access Network (E-UTRAN); Overall description; Stage 2 (Release 8)", April 2010.

SUMMARY OF INVENTION

Technical Problem

It has been studied for NR to configure one or a plurality of BandWidth Parts (BWPs) to a UE per Component Carrier (CC). The BWP may be referred to as a partial frequency band or a partial band.

A plurality of BWPs may be configured to the UE, or the UE may switch between these BWPs, and perform transmission/reception processing. Switching of BWPs may be referred to as BWP switching, BWP changing or BWP adaptation.

Furthermore, it has been studied for NR to use a PUCCH over multiple slots. The PUCCH over the multiple slots may be referred to as a multi-slot PUCCH.

It is assumed to apply BWP adaptation during transmission of the multi-slot PUCCH. However, study on resources of the multi-slot PUCCH in a case where BWP adaptation is applied has not advanced. Therefore, unless control is performed to use appropriate PUCCH resources in a case where an active BWP is switched, there is a risk that a communication throughput and frequency use efficiency deteriorate.

It is therefore one of objects of the present disclosure to provide a user terminal and a radio communication method that can prevent a communication throughput from lowering even when a BWP is switched.

Solution to Problem

A user terminal according to one aspect of the present disclosure includes: a transmission section that transmits an uplink control channel over multiple slots; and a control section that, when changing an active Bandwidth Part (BWP) during the transmission of the uplink control channel, controls the transmission of the uplink control channel after the BWP changing.

Advantageous Effects of Invention

According to one aspect of the present disclosure, it is possible to prevent a communication throughput from lowering even when a BWP is switched.

BRIEF DESCRIPTION OF DRAWINGS

FIG. 9 is a diagram illustrating one example of an association between M and a bandwidth of a BWP.

FIGS. 12A and 12B are diagrams illustrating one example of control of a multi-slot PUCCH during BWP adaptation according to embodiment 3.2.

FIGS. 14A and 14B are diagrams illustrating one example of PUCCH resource sets according to a fifth embodiment.

FIGS. 15A to 15C are diagrams illustrating one example of a frequency offset according to the fifth embodiment.

DESCRIPTION OF EMBODIMENTS

Figure 1B:
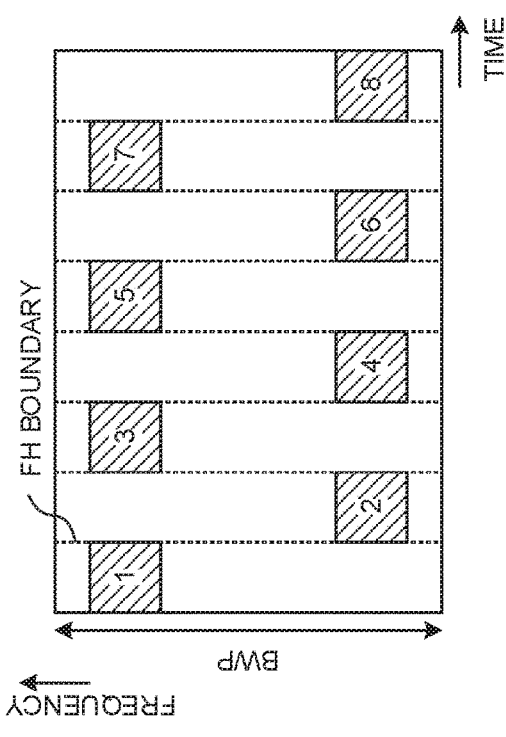
FIGS. 1A to 1C are diagrams illustrating one example of frequency hopping of a multi-slot PUCCH.

It has been studied for NR to configure one or a plurality of Bandwidth Parts (BWPs) to a UE per Component Carrier (CC). The BWP may be referred to as a partial frequency band or a partial band.

A BWP used for DL communication may be referred to as a DL BWP, and a BWP used for UL communication may be referred to as a UL BWP, The UE may assume that one BWP (one DL BWP and one UL BWP) among configured BWPs is active (available) in a given time. Furthermore, frequency bands of a DL BWP and a UL BWP may overlap each other.

A BWP is assumed to be associated with a specific numerology (such as a sub-carrier spacing or a cyclic prefix length), The UE, performs reception in an active DL BWP by using a numerology associated with the DL BWP, and performs transmission in an active UL BWP by using a numerology associated with the UL BWP.

A BWP configuration may include information such as numerologies, a frequency position (e.g., center frequency), a bandwidth (e.g., the number of resource blocks (also referred to as RBs or Physical RBs (PRBs)), and time resources (e.g., a slot (mini slot) index or a periodicity).

The BWP configuration may be notified by, for example, a higher layer signaling. In this regard, the higher layer signaling may be, for example, one of a Radio Resource Control (RRC) signaling, a Medium Access Control (MAC) signaling and broadcast information, or a combination of these.

The MAC signaling may use, for example, an MAC Control Element (MAC CE) or an MAC Protocol Data Unit (MAC PDU). The broadcast information may be, for example, a Master Information Block (MIB), a System Information Block (SIB), or Remaining Minimum System Information (RMSI).

The UE may monitor a search space (downlink control channel candidate) or a downlink control channel (e.g., PDCCH) associated with the COntrol REsource SET (CORESET) in at least one of configured DL BWPs (e.g., a DL BWP included in a primary CC).

The CORESET is a control channel (e.g., Physical Downlink Control Channel (PDCCH)) allocation candidate domain, and may be referred to as a control subband, a search space set, a search space resource set, a control domain, a controlling subband and an NR-PDCCH domain.

A plurality of BWPs may be configured to the UE, and the UE may switch between these BWPs, and perform transmission/reception processing. As a switching method, a method for indicating a BWP that is made active (activated) by an MAC signaling and/or DCI, and a method for switching to a default BWP when a given timer expires have been studied. Switching of the BWP may be referred to as BWP switching, BWP changing, and BWP adaptation.

By, for example, causing the UE to use a BWP of a wide band when there is data, and using a BWP of a narrow band for CORESET monitoring when there is not data, it is possible to reduce power consumption of the UE.

In addition, the default BWP may be configured to the UE by, for example, a higher layer signaling, or may be assumed as the same as an active BWP that is used first (initial active BWP).

Furthermore, it has been studied for NR support a UL control channel (also referred to as a short PUCCH or a shortened PUCCH below) of a shorter duration than those of Physical Uplink Control Channel (PUCCH) formats of legacy LTE systems (e.g., LTE Rel. 8 to 13), and/or a UL control channel (also referred to as a long PUCCH below) of a longer duration than the shorter duration.

As, for example, a short PUCCH format, a PUCCH format 0 whose number of bits of UCI to convey is 2 or less and whose number of OFDM symbols is 1, 2 or 3 bits, and a PUCCH format 2 whose number of bits of UCI to convey is larger than 2 and whose number of OFDM symbols is 1, 2 or 3 bits have been studied.

Furthermore, as a long PUCCH format, a PUCCH format 1 whose number of bits of UCI to convey is 2 or less and whose number of OFDM symbols is 4 to 14 bits, and a PUCCH format 3 whose number of bits of UCI to convey is larger than 2 and whose number of OFDM symbols is 4 to 14 bits have been studied.

In addition, a "PUCCH" simply described in this description may be read as "a long PUCCH and/or a short PUCCH".

It has been studied for NR to use a PUCCH over multiple slots. The PUCCH over the multiple slots may be referred to as a multi-slot PUCCH.

The same data (UCI) may be transmitted or different data may be transmitted in each slot by the multi-slot PUCCH. When the same data is transmitted, reduction of an error rate of the UCI can be expected. When the different data is transmitted, improvement of a throughput can be expected.

The multi-slot PUCCH may support intra-slot frequency hopping and/or inter-slot frequency hopping. In addition, it may be assumed that both of these intra-slot and inter-slot frequency hopping cannot be concurrently enabled for an identical UE, or it may be assumed that these intra-slot and inter-slot frequency hopping can be concurrently enabled.

Figure 1A:
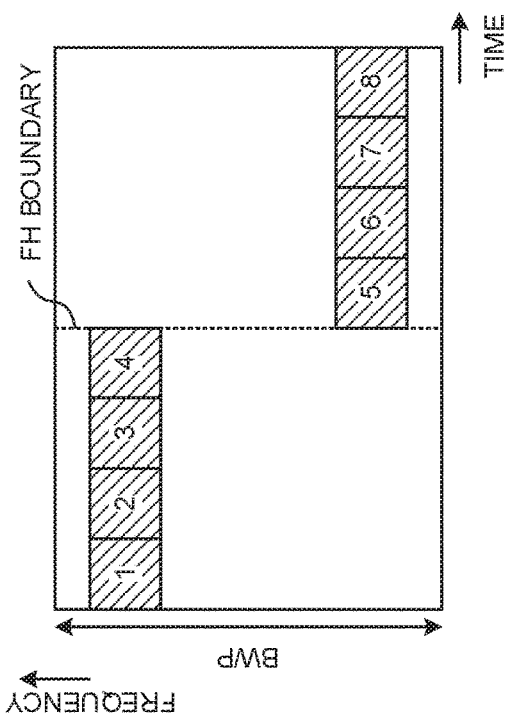
Figure 1C:
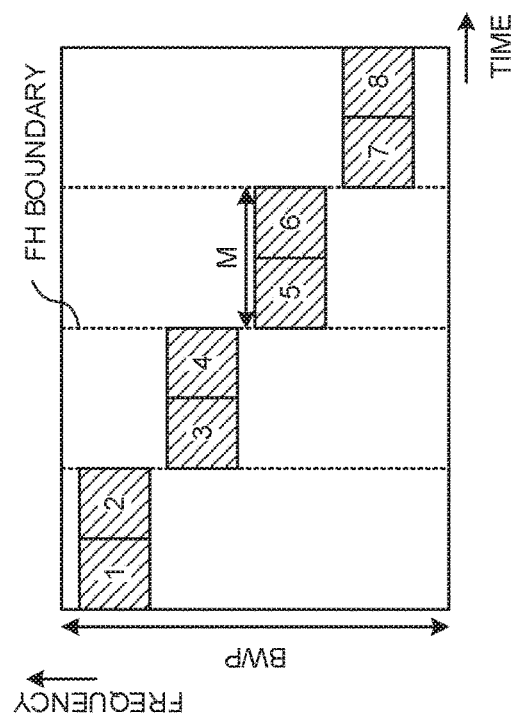

FIGS. 1A to 1C are diagrams illustrating one example of frequency hopping of a multi-slot PUCCH. FIGS. 1A to 1C each illustrate an example of the multi-slot PUCCH over 8 slots. Each of FIGS. 1A to 1C illustrates a Frequency Hopping (FH) boundary.

FIG. 1A illustrates the example where a first hop includes 4 slots (slot indices=1 to 4), and a second hop includes 4 slots (slot indices=5 to 8).

FIG. 1B illustrates the example where each hop includes 1 slot. FIG. 1C illustrates the example where each hop includes 2 slots. A number of slots M=2 in a case in FIG. 1C) per hop illustrated in FIG. 1C may be configured by, for example, a higher layer signaling.

In this regard, the figures related to PUCCH resources in this description suppose that one square represents a resource of 1 PRB and 1 slot. However, the present invention is not limited to this. For example, a frequency resource associated with one square domain may be one or plurality of subcarriers, subbands, Resource Elements (REs), PRBs or RB groups. Furthermore, a time resource associated with one square domain may be one or a plurality of symbols, mini slots, slots or subframes.

Furthermore, in this description, terms related to frequency resources such as subcarriers, subbands, REs, PRBs and RB groups can be read interchangeably. In this description, terms related to symbols, mini slots, slots and subframes can be read interchangeably.

Information related to a frequency resource of a specific hop may be notified to the UE by using a higher layer signaling. The information related to the frequency resource of the specific hop may include at least one of, for example, information of a given reference frequency resource (e.g., a frequency resource of the first hop), and information of a frequency offset (also referred to simply as a "frequency offset" below) from the reference frequency resource to the frequency resource of the specific hop.

Figure 2B:
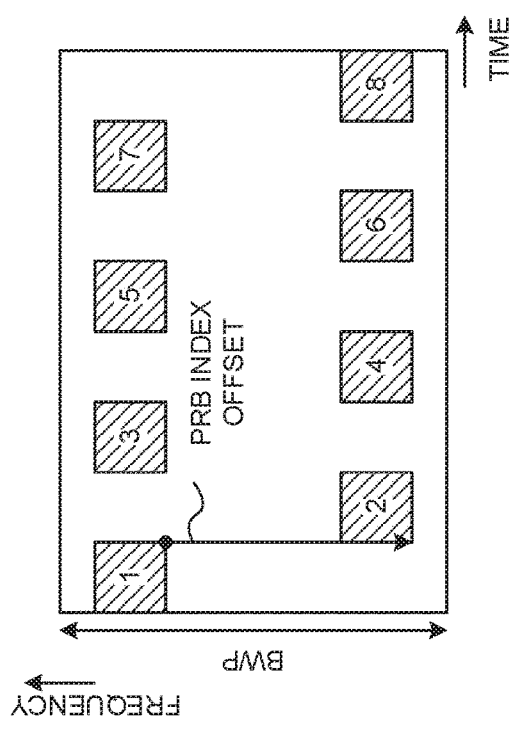
FIGS. 2A to 2C are diagrams illustrating one example of a frequency offset applied to a multi-slot PUCCH.
Figure 2A:
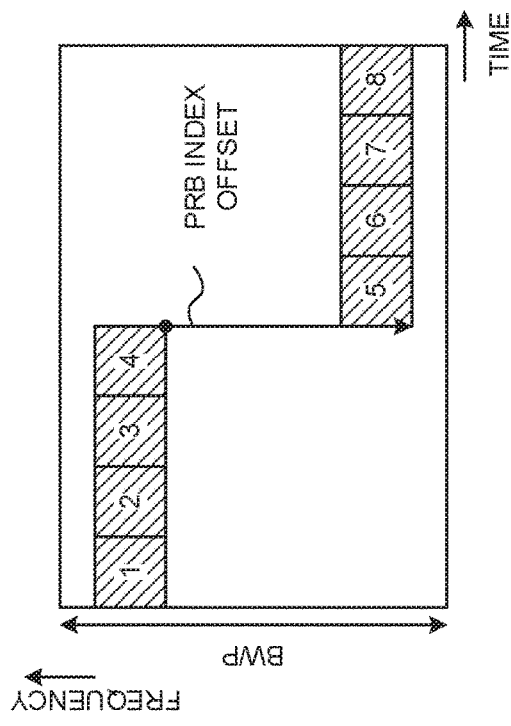
Figure 2C:
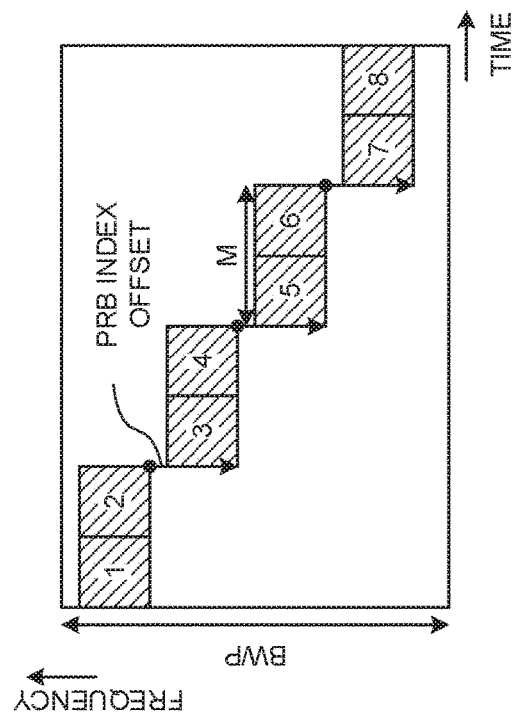

The information of the frequency offset may be indicated by, for example, a PRB index. FIGS. 2A to 2C are diagrams illustrating one example of frequency offsets to be applied to multi-slot PUCCHs. FIGS. 2A to 2C illustrate the same examples as those in FIGS. 1A to 1C, and illustrate PRB index offsets as inter-hop frequency offsets.

By the way, it is assumed that BWP adaptation is applied during transmission of a multi-slot PUCCH. However, in this case, when the UE tries to transmit the PUCCH by using the same frequency resource before and after BWP changing, situations that some PUCCHs cannot be transmitted, or PUCCH resources divide a band in a BWP occur.

Figure 3:
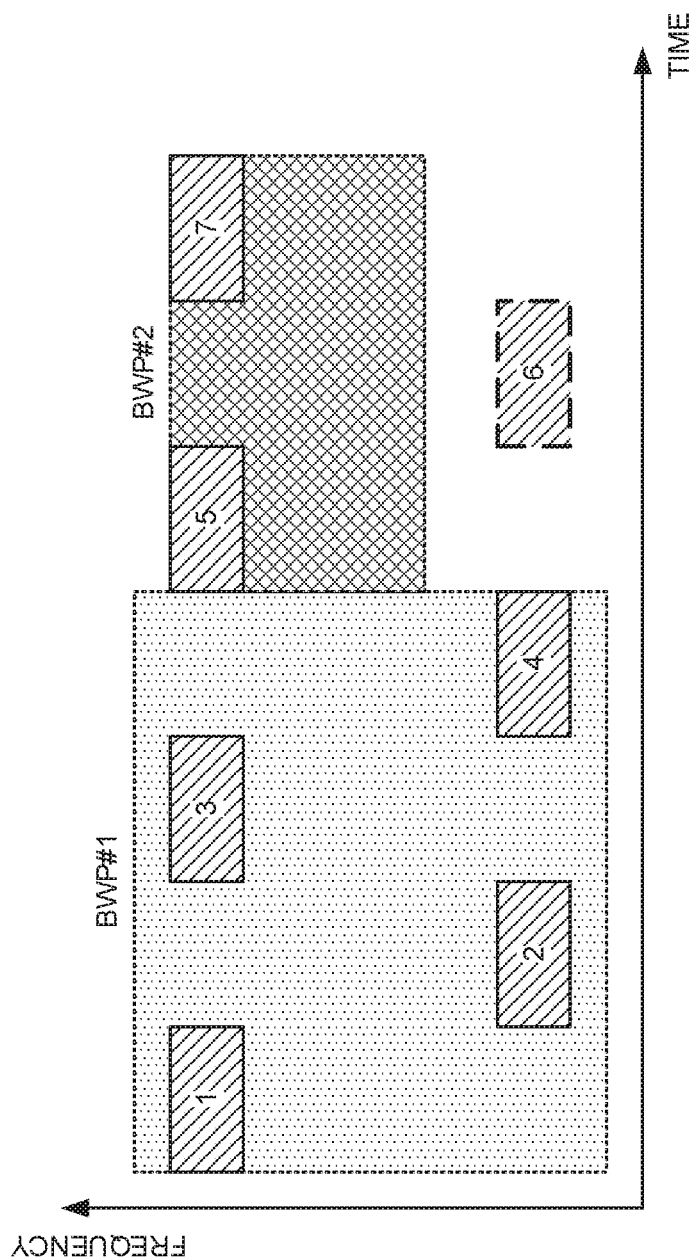
FIG. 3 is a diagram illustrating one example of a problem that occurs in a multi-slot PUCCH during BWP adaptation.

FIG. 3 is a diagram illustrating one example of a problem that occurs in a multi-slot PUCCH during BWP adaptation. In this example, the UE switches an active BWP from a BWP #1 to a BWP #2 of a relatively narrow bandwidth. On the other hand, PUCCH resources are determined based on a BWP #1 configuration. In this case, a sixth PUCCH resource is located outside a range of the BWP #2, and therefore the UE cannot transmit the sixth PUCCH resource (information that needs to be transmitted by using the sixth PUCCH resource).

Figure 4:
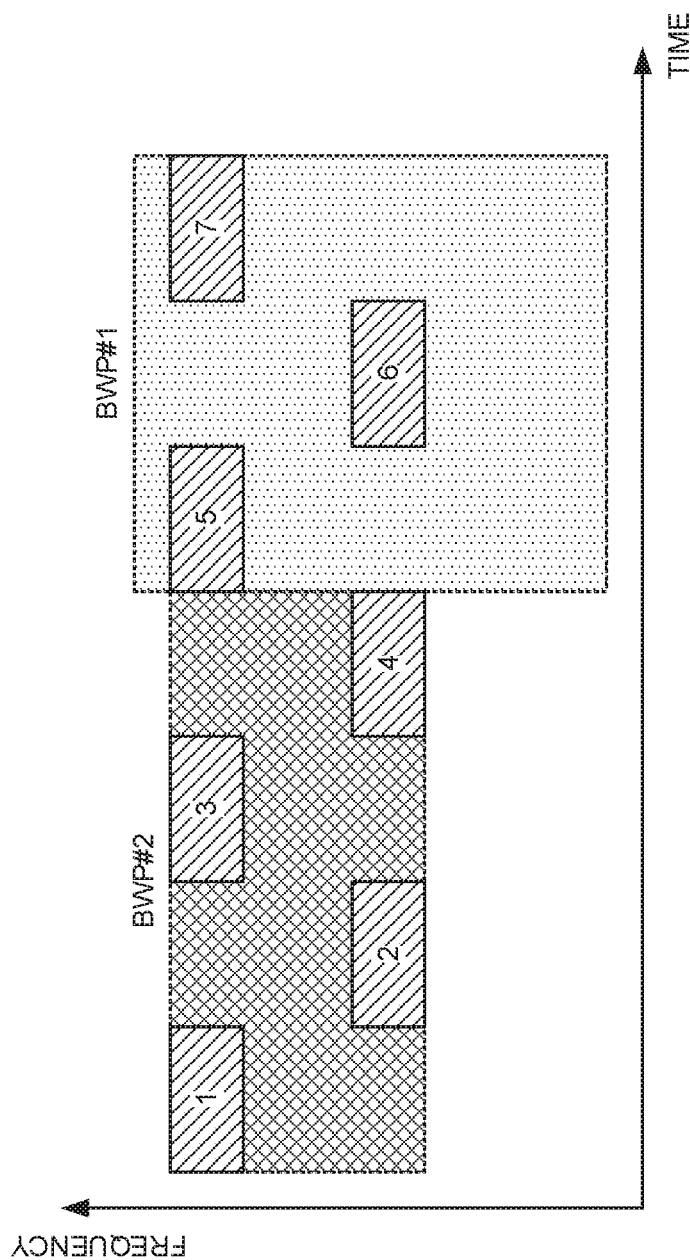
FIG. 4 is a diagram illustrating another example of the problem that occurs in the multi-slot PUCCH during BWP adaptation.

FIG. 4 is a diagram illustrating another example of a problem that occurs in a multi-slot PUCCH during BWP adaptation. In this example, the UE switches an active BWP from the BWP #2 to the BWP #1 of a relatively wide bandwidth. On the other hand, PUCCH resources are determined based on a BWP #2 configuration. In this case, a sixth PUCCH resource is located near the center of the BWP #1. Therefore, the sixth PUCCH resource divides the BWP #1, and it is not possible to transmit another signal (e.g., PUCCH) by using a wide contiguous band.

When the active BWP is switched as illustrated in FIGS. 3 and 4, unless control is performed to use appropriate PUCCH resources, there is a risk that a communication throughput and frequency use efficiency deteriorate.

Hence, the inventors of this application have conceived a method for appropriately controlling transmission of a multi-slot PUCCH even when BWP adaptation is applied.

An embodiment according to the present invention will be described in detail below with reference to the drawings, A radio communication method according to each embodiment may be each applied alone or may be applied in combination.

In addition, this description mainly describes an example where, as illustrated in FIGS. 3 and 4, 4 slots (first to fourth slots) of the multi-slot PUCCH are transmitted before BWP adaptation, and the rest of 3 slots (fifth to seventh slots) are transmitted after the BWP adaptation. However, these numbers of slots may be optional numbers of slots. Furthermore, the multi-slot PUCCH according to each embodiment supposes a multi-slot PUCCH whose transmission is started before BWP adaptation, and whose transmission is scheduled after the BWP adaptation, too. However, the present invention is not limited to this.

In description of the following embodiments, a "PUCCH" may mean a multi-slot PUCCH.

Furthermore, the following embodiments will be described supposing the BWP #1 as a BWP of a relatively wide bandwidth, and the BWP #2 as a BWP of a relatively narrow bandwidth. As examples of BWP adaptation, a case where the BWP adaptation narrows a bandwidth of a BWP (the BWP #1→ the BWP #2), and a case where the BWP adaptation widens a bandwidth of a BWP (the BWP #2→ the BWP #1) will be described in each embodiment. The former will be also referred to as a "case 1", and the latter will be also referred to as a "case 2" below.

(Radio Communication Method)

First Embodiment

According to the first embodiment, a UE assumes that a frequency resource for a second or subsequent slot of a multi-slot PUCCH is not derived from a BWP. In other words, the frequency resource for the second or subsequent slot of the multi-slot PUCCH is not influenced by BWP adaptation, and is determined based on a BWP in which a first slot has been transmitted.

According to the first embodiment, even when BWP adaptation is applied, the UE continues using values that are used as a reference frequency resource and a frequency offset in a first BWP. Some embodiments will be described below.

Embodiment 1.1

Figure 5A:
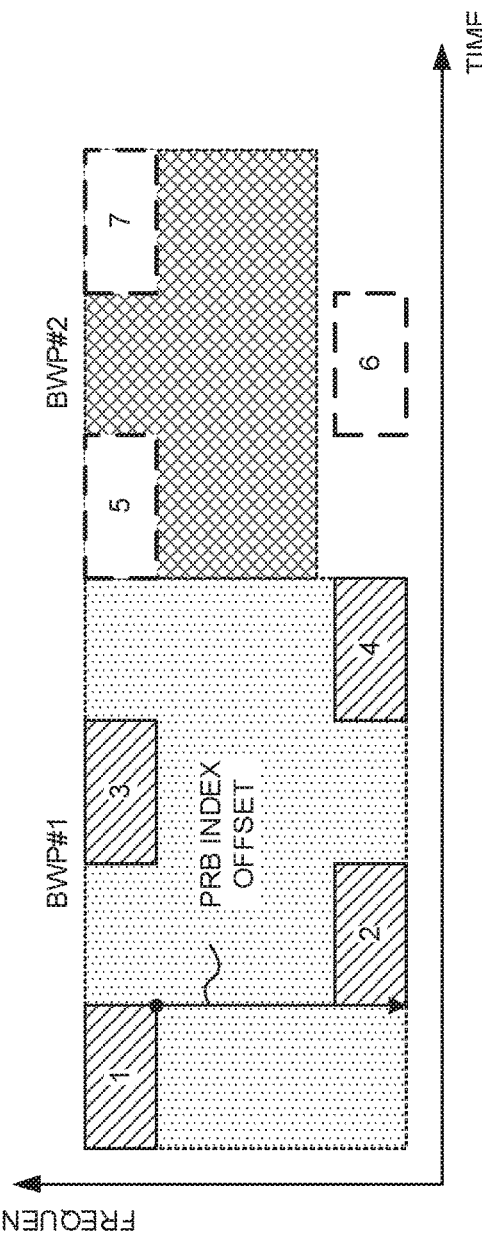
FIGS. 5A and 5B are diagrams illustrating one example of control of a multi-slot PUCCH during BWP adaptation according to embodiment 1.1.
Figure 5B:
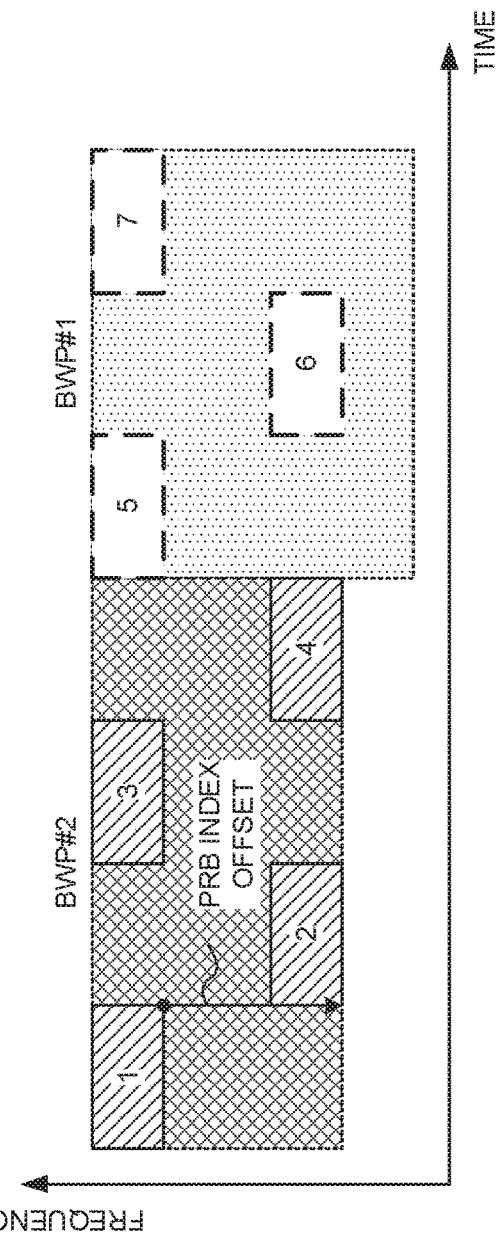

According to embodiment 1.1, a UE drops PUCCH transmission in a slot after BWP adaptation. FIGS. 5A and 5B are diagrams illustrating one example of control of a multi-slot PUCCH during BWP adaptation according to embodiment 1.1. FIG. 5A illustrates a case 1, and FIG. 5B illustrates a case 2.

In a case of embodiment 1.1, in both of the cases 1 and 2, all of transmission of the multi-slot PUCCH in slots after BWP adaptation is dropped.

According to a configuration of embodiment 1.1, the UE only needs to perform control to drop transmission of the multi-slot PUCCH when BWP adaptation is applied, so that it is possible to suppress an increase in a UE load related to the multi-slot PUCCH.

In addition, in this description, "drop" may be read as "do not transmit", "stop transmission" or "interrupt transmission" interchangeably. Furthermore, "drop PUCCH transmission" may be read as "drop a PUCCH" or "drop PUCCH resources" interchangeably.

Embodiment 1.2

Figure 6A:
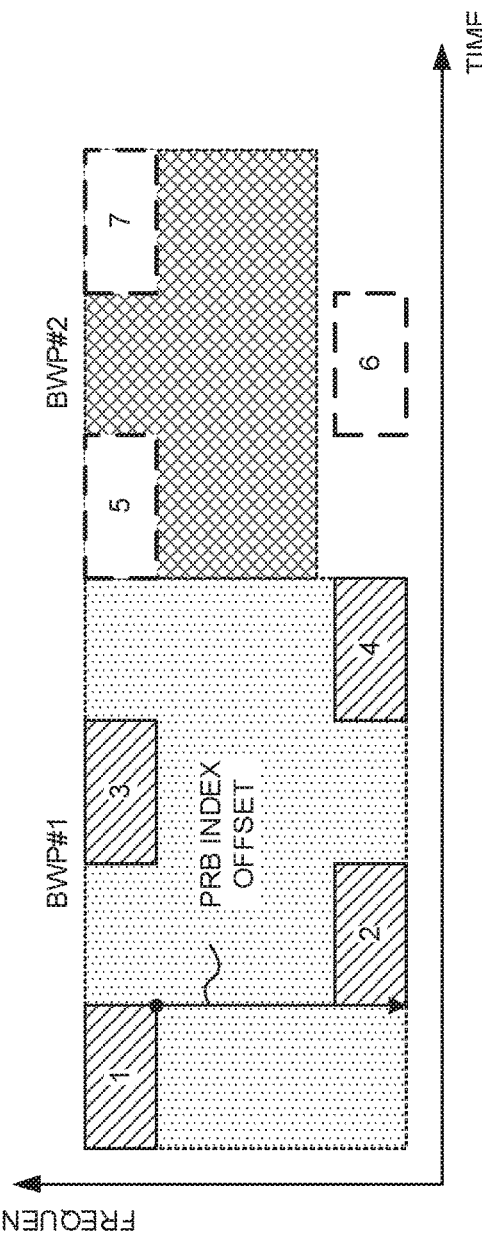
FIGS. 6A and 6B are diagrams illustrating one example of control of a multi-slot PUCCH during BWP adaptation according to embodiment 1.2.
Figure 6B:
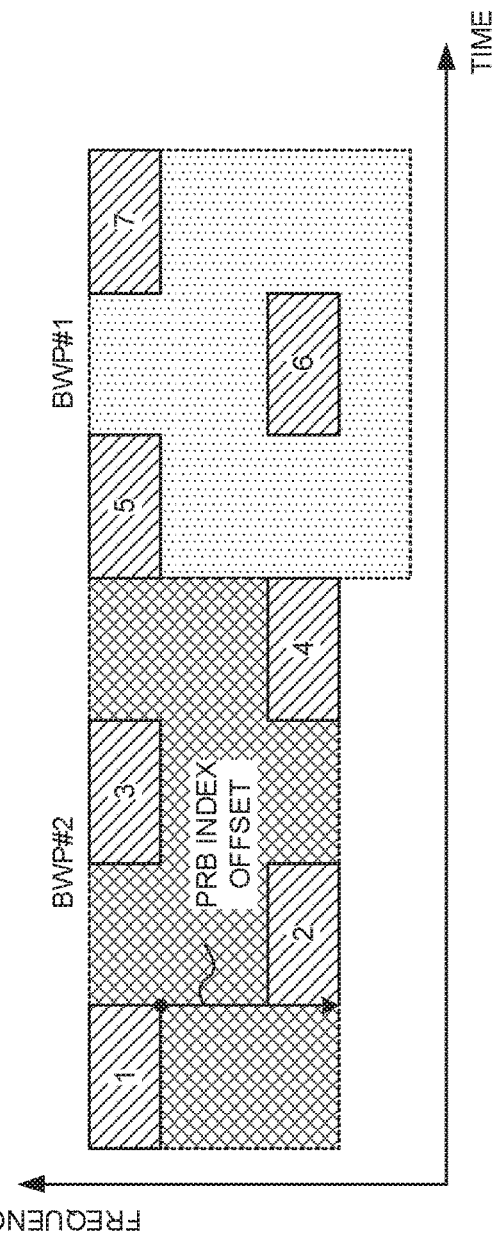

According to embodiment 1.2, when BWP adaptation narrows a bandwidth of an active BWP, a UE drops PUCCH transmission in a slot after the BWP adaptation. FIGS. 6A and 6B are diagrams illustrating one example of control of a multi-slot PUCCH during BWP adaptation according to embodiment 1.2. FIG. 6A illustrate a case 1, and FIG. 6B illustrates a case 2.

In a case of embodiment 1.2, multi-slot PUCCH transmission in a slot after BWP adaptation is dropped in the case 1. On the other hand, multi-slot PUCCH transmission in a slot after BWP adaptation is not dropped and the multi-slot PUCCH is transmitted in the case 2.

According to a configuration of embodiment 1.2, it is possible to suppress an increase in a UE load in the case 1. It is possible to suitably continue transmission of a PUCCH in the case 2, so that it is possible to reserve a coverage of the PUCCH.

Embodiment 1.3

Figure 7A:
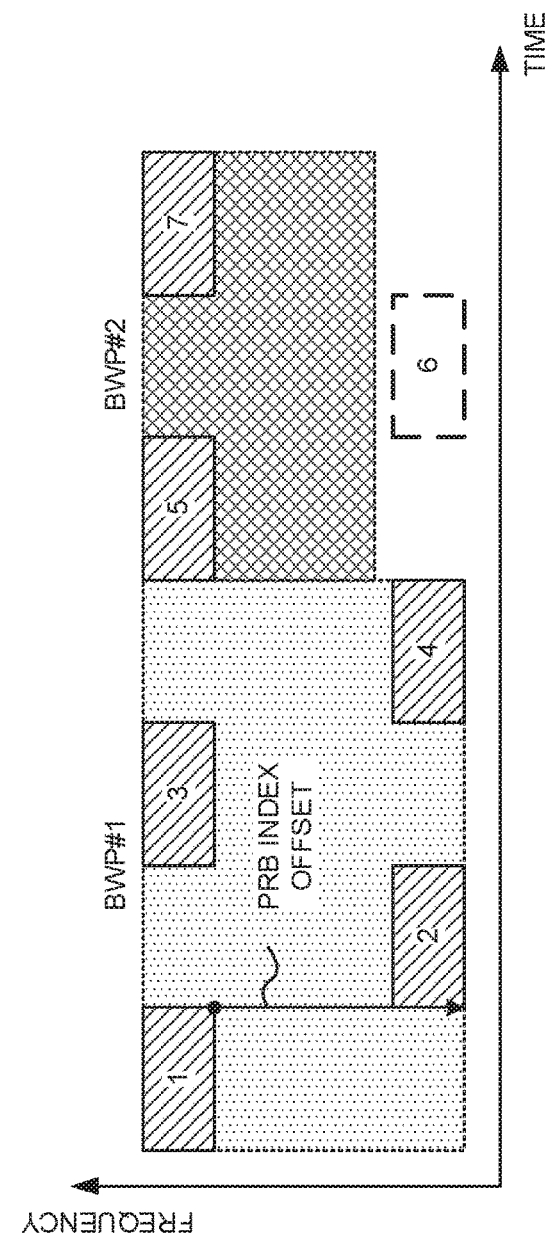
FIGS. 7A and 7B are diagrams illustrating one example of control of a multi-slot PUCCH during BWP adaptation according to embodiment 1.3.
Figure 7B:
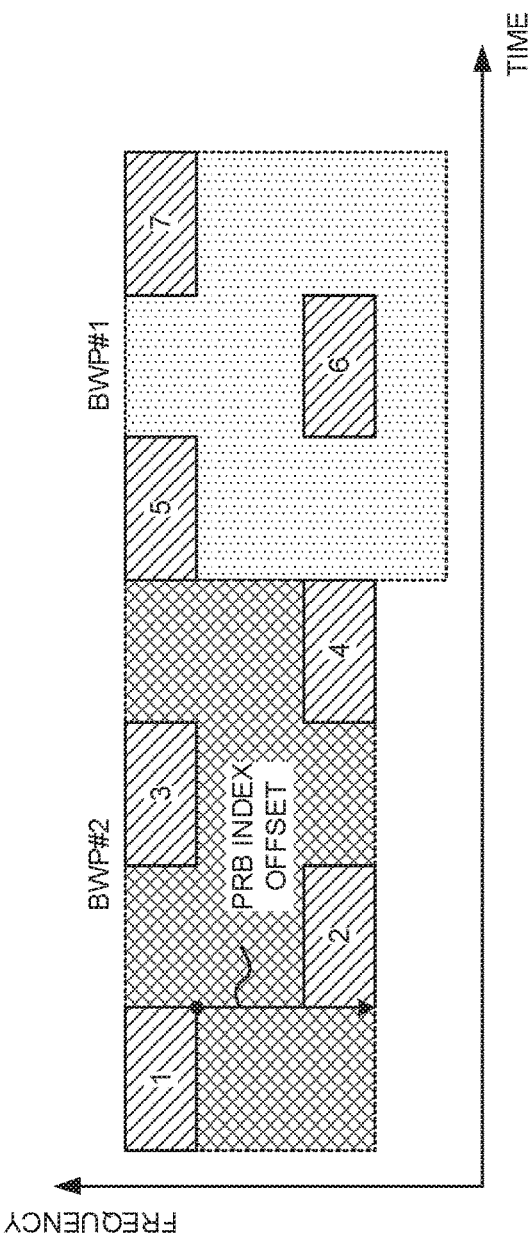

According to embodiment 1.3, a UE drops PUCCH transmission corresponding to frequency resources outside a range of a BWP in a slot after BWP adaptation. FIGS. 7A and 7B are diagrams illustrating one example of control of a multi-slot PUCCH during BWP adaptation according to embodiment 1.3. FIG. 7A illustrates a case 1, and a FIG. 7B illustrates a case 2.

In the example in FIG. 7A, a sixth PUCCH resource is located outside a range of a BWP #2, and therefore the UE drops the sixth PUCCH resource. On the other hand, fifth and seventh PUCCH resources are located in the range of the BWP #2, and therefore the UE transmits these PUCCH resources.

In the example in FIG. 7B, all of the fifth to seventh slots are located in the range of a BWP #2, and therefore the UE transmits the fifth to seventh PUCCH resources.

According to a configuration of embodiment 1.3, it is possible to transmit a PUCCH by using resources in a band of a BWP while appropriately dropping PUCCH transmission in resources that are outside the band of the BWP and cannot be used for transmission.

Embodiment 1.4

According to embodiment 1.4, a UE drops PUCCH transmission corresponding to frequency resources of a specific range in a BWP in a slot after BWP adaptation. For example, the specific range may be near a center of the BWP, may be defined as, for example, a range equal to or more than a first threshold and less than a second threshold, or may be defined as a range within a third threshold from a center frequency of the BWP.

At least one of these thresholds may be defined by a specification, or may be notified by a higher layer signaling, a physical layer signaling (e.g., Downlink Control Information (DCI)) or a combination of these signalings. In addition, a threshold may be expressed by, for example, an absolute value or a relative value of a PRB index.

Figure 8:
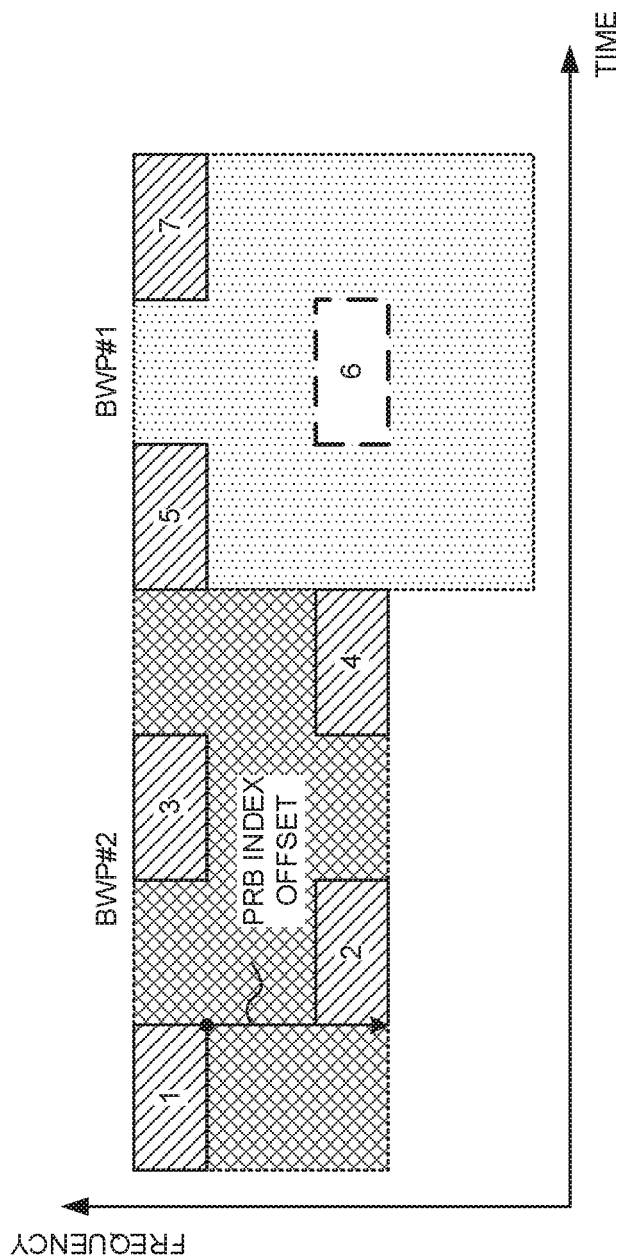
FIG. 8 is a diagram illustrating one example of control of a multi-slot PUCCH during BWP adaptation according to embodiment 1.4.

FIG. 8 is a diagram illustrating one example of control of a multi-slot PUCCH during BWP adaptation according to embodiment 1.4. FIG. 8 illustrates a case 2. This example supposes that the specific range is near the center of the BWP.

In the example in FIG. 8, a sixth PUCCH resource is located near a center of a BWP #2, and therefore the UE drops the sixth PUCCH resource. On the other hand, fifth and seventh PUCCH resources are located at an edge of the BWP #2, and therefore the UE transmits these PUCCH resources.

According to a configuration of embodiment 1.4, it is possible to drop PUCCH transmission that divides a BWP, and transmit another signal (e.g., PUSCH) by using a wide and contiguous band.

In addition, according to the first embodiment, the UE may use PUCCH resources to drop as resources for transmission of another signal (e.g., PUSCH).

According to the above-described first embodiment, even when BWP adaptation is applied during transmission of a multi-slot PUCCH, it is possible to appropriately decide control of (whether or not to drop) PUCCH transmission that uses PUCCH resources based on a first BWP.

Second Embodiment

According to the second embodiment, a UE assumes that a frequency resource for a second or subsequent slot of a multi-slot PUCCH is derived from a BWP. In other words, the frequency resource for the second or subsequent slot of the multi-slot PUCCH is influenced by BWP adaptation, and is determined based on a BWP for actually transmitting the PUCCH.

The UE determines a value of a frequency offset k from a reference frequency resource to a frequency resource of a specific hop based on the BWP. For example, the UE may determine the value of the frequency offset k according to k=M*m. In addition, when BWP adaptation is not applied, the frequency offset may be determined based on the BWP.

In this regard, M may be a value determined based on a parameter related to the BWP. For example, M may be a value based on a bandwidth related to the BWP, or may be a value based on a numerology (e.g., Sub-Carrier Spacing (SCS)) used for the BWP. In addition, the bandwidth related to the BWP may be at least one of a cell bandwidth (cell BW), a system bandwidth (system BW), a bandwidth of a BWP configured to the UE (UE BWP), a bandwidth of the UL BWP and a bandwidth of a BWP.

Figure 9:
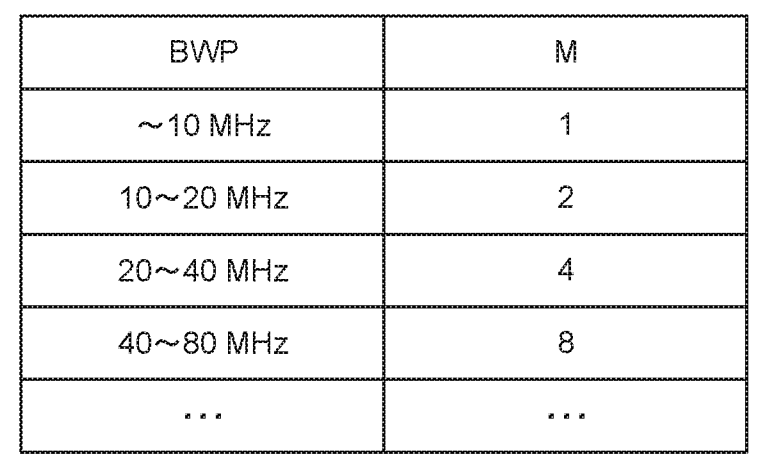

M may be indicated by a higher layer signaling and/or a physical layer signaling, or may be specified in advance per BWP. FIG. 9 is a diagram illustrating one example of an association between NI and a bandwidth of a BWP. M may be associated with M=1 when the bandwidth of the BWP is less than 10 MHz, M=2 when the bandwidth of the BWP is equal to or more than 10 MHz and less than 20 MHz, M=4 when the bandwidth of the BWP is equal to or more than 20 MHz and less than 40 MHz, and M=8 when the bandwidth of the BWP is equal to or more than 40 MHz and less than 80 MHz.

m may be referred to as, for example, an offset coefficient, may be indicated by a higher layer signaling and/or a physical layer signaling (e.g., DCI), or may be derived by the UE according to a given rule. For example, m may be determined based on a UE group, a UE category or a service type (e.g., enhanced Mobile Broad Band (eMBB), enhanced Machine Type Communication (eMTC) or Ultra Reliable and Low Latency Communications (URLLC)).

Figure 10A:
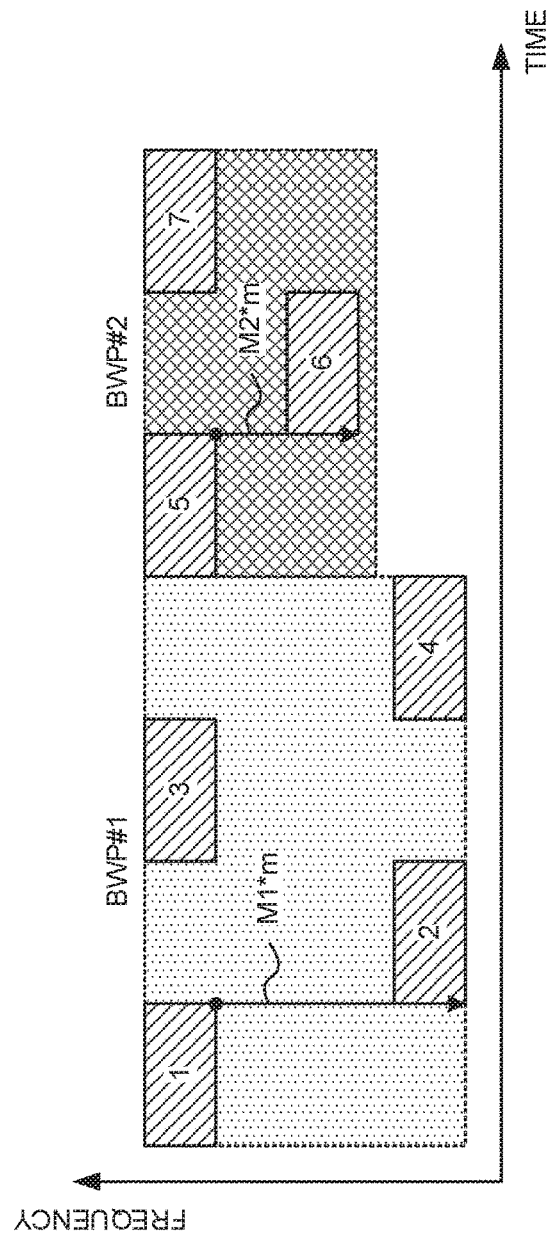
FIGS. 10A and 10B are diagrams illustrating one example of control of a multi-slot PUCCH during BWP adaptation according to a second embodiment.
Figure 10B:
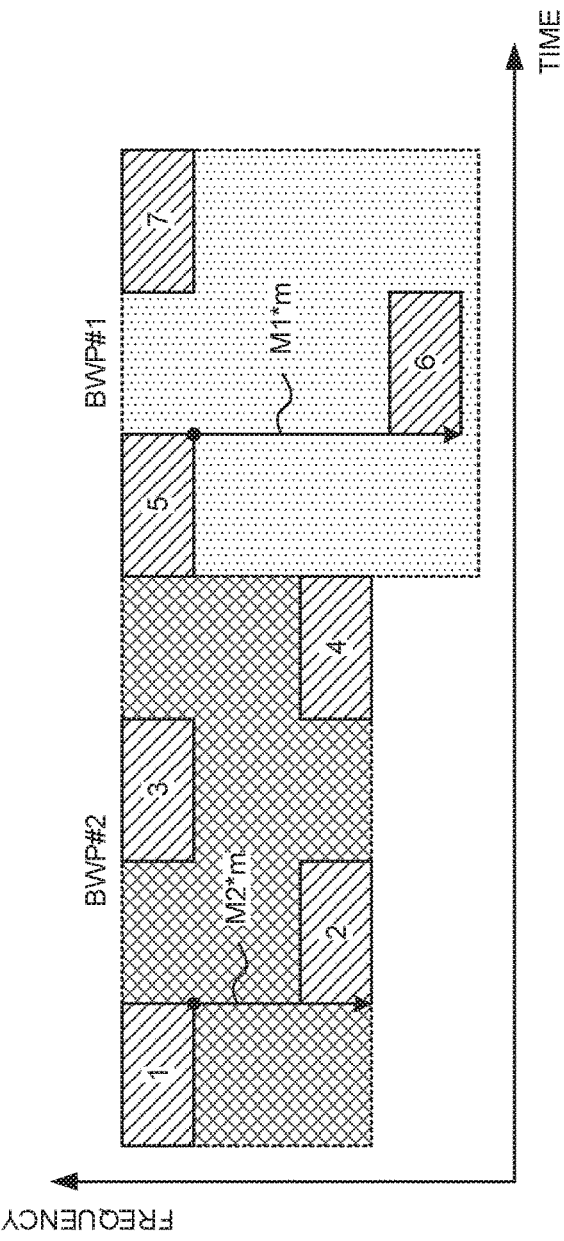

FIGS. 10A and 10B are diagrams illustrating one example of control of a multi-slot PUCCH during BWP adaptation according to the second embodiment. FIG. 10A illustrates a case 1, and FIG. 10B illustrates a case 2.

In this case, the frequency offset k=M* m is assumed, and m is assumed as a fixed value. As M of the equation, the UE uses, for the BWP #1, M1 determined based on a BWP #1, and use, for a BWP #2. M2 determined based on the BWP #2. The BWPs #1 and #2 have different bandwidths, and M1 and M2 take different values.

In a case of the second embodiment, even in both of the cases 1 and 2, resources of the multi-slot PUCCH in a slot after BWP adaptation are derived so as to be located within a BWP range, so that it is possible to suitably continue transmitting a PUCCH without causing drop, too.

According to the above-described second embodiment, even when BWP adaptation is applied during transmission of the multi-slot PUCCH, it is possible to appropriately adjust the PUCCH resources per BWP.

Third Embodiment

According to the third embodiment, a UE assumes that a method (that may be referred to as an allocation rule or PUCCH resource indexing) for allocating indices related to frequency resources of a multi-slot PUCCH is associated with a given bandwidth. Examples of the allocation method where the allocation method is associated with a bandwidth of a BWP (embodiment 3.1) and is associated with a system bandwidth (embodiment 3.2) will be described below.

Embodiment 3.1

According to embodiment 3.1, a UE assumes that indices related to frequency resources of a multi-slot PUCCH are indexed per BWP (a starting index is determined). In other words, the frequency resources (indices) of the multi-slot PUCCH are influenced by BWP adaptation, and are determined based on a BWP for actually transmitting a PUCCH.

For example, the UE may assume that the indices of the PUCCH resources are allocated from one edge of a frequency band of a configured (and/or active) BWP.

Figure 11A:
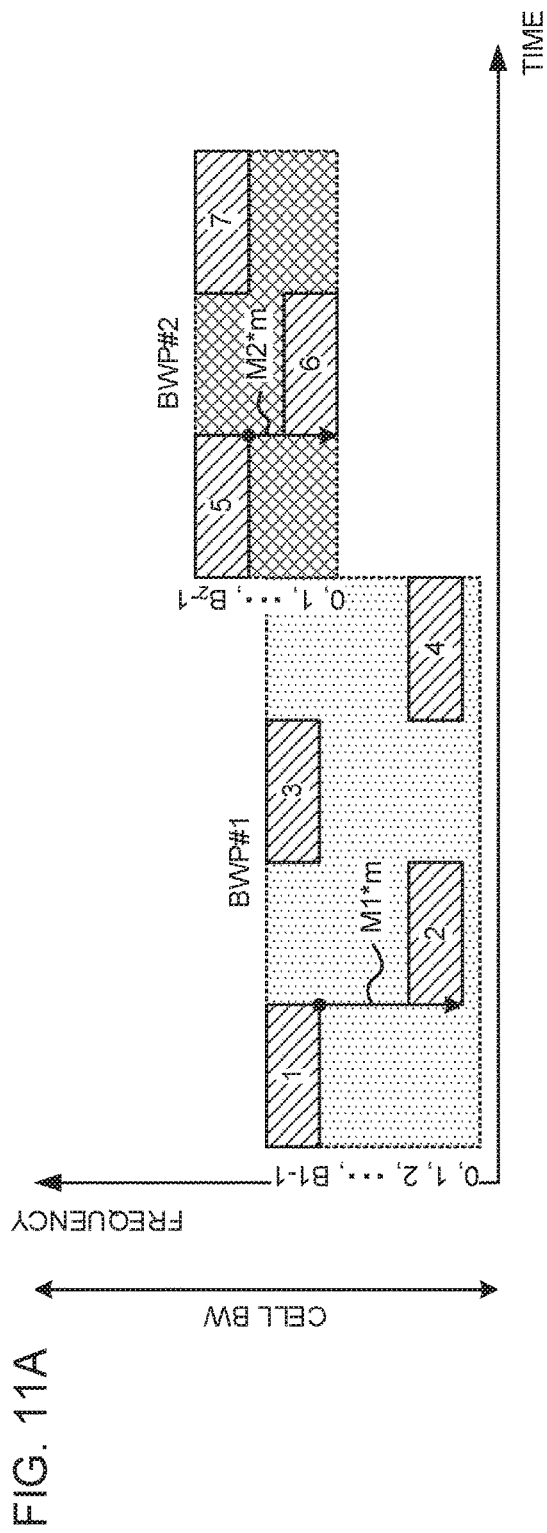
FIGS. 11A and 11B are diagrams illustrating one example of control of a multi-slot PUCCH during BWP adaptation according to embodiment 3.1.
Figure 11B:
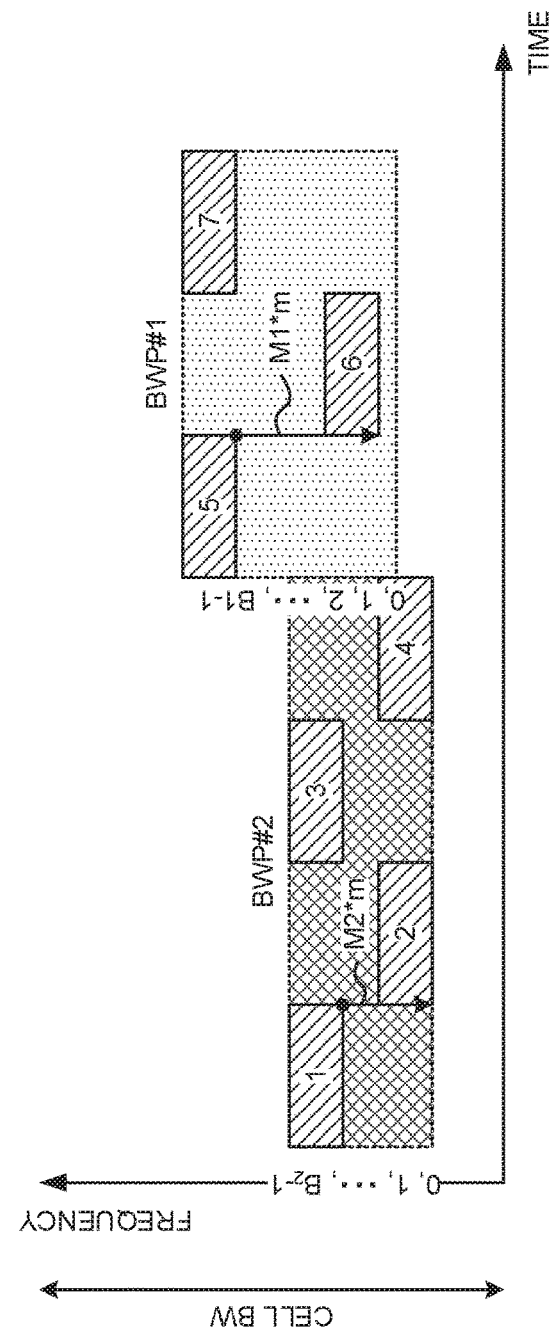

FIGS. 11A and 11B are diagrams illustrating one example of control of a multi-slot PUCCH during BWP adaptation according to embodiment 3.1. FIG. 11A illustrates a case 1, and FIG. 11B illustrates a case 2.

In addition, this example assumes a frequency offset k=M*m as described in the second embodiment. However, application of embodiment 3.1 is not limited to this.

In this example, contiguous numbers are allocated to the indices of the PUCCH resources of a BWP #1 such that a PRB at one edge of the frequency band of the BWP #1 is 0, and a PRB at the other edge is $B_1-1$. Contiguous numbers are allocated to the indices of the PUCCH resources of a BWP #2 such that a PRB at one edge of the frequency band of the BWP 42 is 0, and a PRB at the other edge is $B_2-1$.

As illustrated in FIGS. 11A and 11B, when a center frequency of the BWP changes, a start position of the indices of the PUCCH resources changes. Therefore, a reference frequency resource also fluctuates per BWP. Consequently, according to embodiment 3.1, even when the center frequency of the BWP significantly changes before and after BWP adaptation, the UE can determine the PUCCH resources so as to be located within the BWP range.

Embodiment 3.2

According to embodiment 3.2, a UE assumes that indices related to frequency resources of a multi-slot PUCCH are indexed without depending on a BWP. In other words, a position of a reference frequency resource of the frequency resources of the multi-slot PUCCH is not influenced by BWP adaptation. For example, it may be assumed that the indices related to the frequency resources of the multi-slot PUCCH are indexed depending on a cell BW or a system BW.

FIGS. 12A and 12B are diagrams illustrating one example of control of a multi-slot PUCCH during BWP adaptation according to embodiment 3.2. FIG. 12A illustrates a case 1, and FIG. 12B illustrates a case 2.

In addition, this example assumes a frequency offset k=M*m as described in the second embodiment. However, application of embodiment 3.2 is not limited to this.

In this example, contiguous numbers are allocated to the indices of the PUCCH resources such that a PRB at one edge of the cell BW is 0, and a PRB at the other edge is $B_{Cell}-1$.

As illustrated in FIGS. 12A and 12B, even when a center frequency of the BWP changes, a start position of the indices of the PUCCH resources is the same. Therefore, the reference frequency resource is also the same. Therefore, it is assumed that, when the center frequency of the BWP significantly changes before and after BWP adaptation, the PUCCH resources are located outside the BWP range.

In the examples in FIGS. 12A and 12B, a sixth PUCCH resource is located outside a range of an active BWP (BWP #2 or #1). The UE may drop the sixth PUCCH resource outside the range as described in embodiment 1.3. According to embodiment 3.2, the UE can grasp the indices of the PUCCH resources that are common between BWPs, so that it is possible to suppress an increase in a load of recognition of the PUCCH resource indices.

According to the above-described third embodiment, even when BWP adaptation is applied during transmission of the multi-slot PUCCH, it is possible to appropriately decide the PUCCH resources per BWP.

Fourth Embodiment

According to the fourth embodiment, a UE may assume that frequency resources of a multi-slot PUCCH conform to resources configured in association with an active BWP.

In this regard, resources configured in association with the BWP may be resources such as CSI (e.g., CQI) reporting resources or Semi-Persistent Scheduling (SPS) resources that are semi-statically configured by using a higher layer signaling.

When BWP adaptation is applied (when the BWP is changed), the UE may recognize that the PUCCH resources in a slot after the BWP adaptation are resources to be configured for the BWP after the adaptation. In this case, the UE may drop PUCCH transmission that uses PUCCH resources in the slot after the BWP adaptation, or may perform PUCCH transmission.

Figures 13A, 13B:
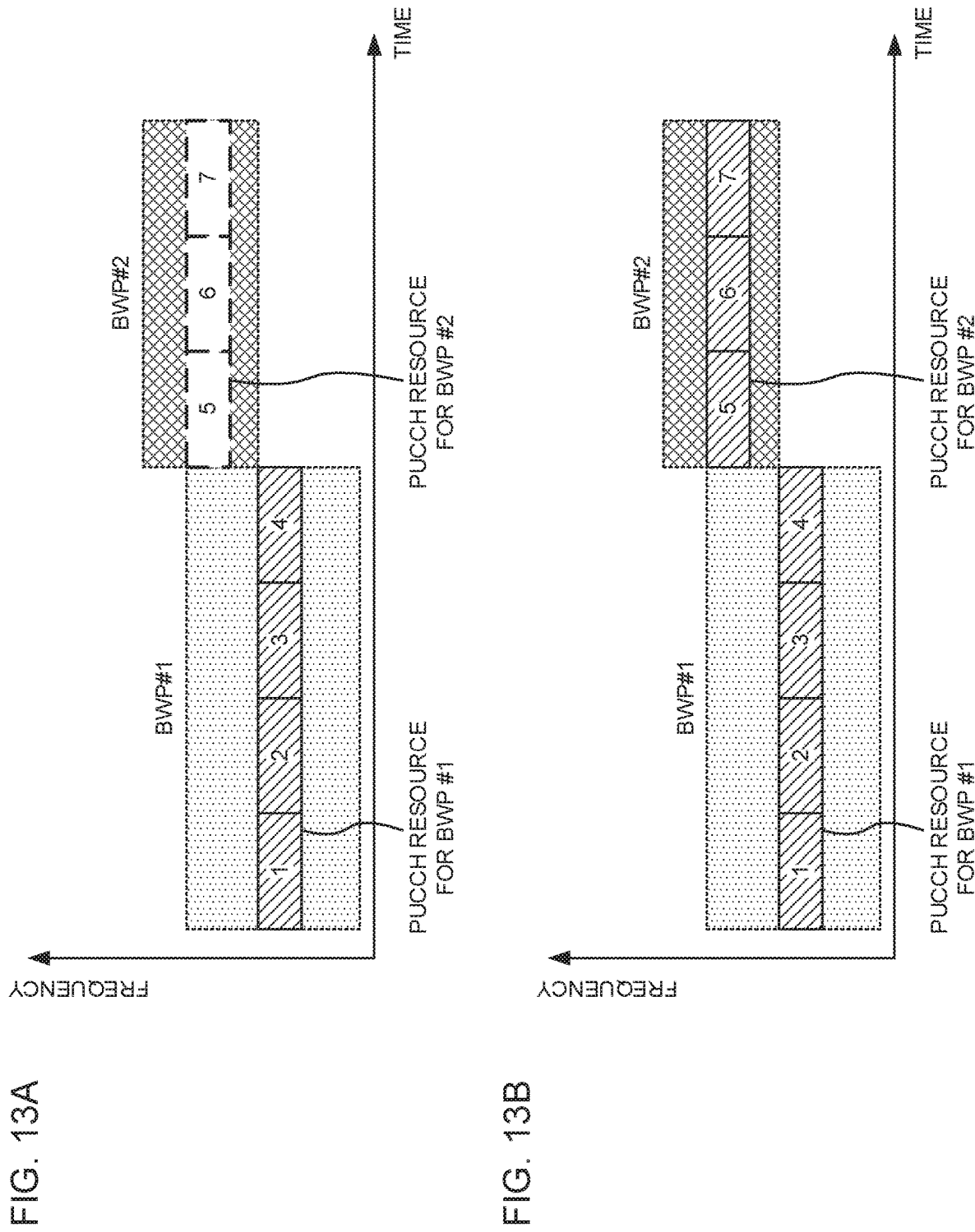
FIGS. 13A and 13B are diagrams illustrating one example of control of a multi-slot PUCCH during BWP adaptation according to a fourth embodiment.

FIGS. 13A and 13B are diagrams illustrating one example of control of a multi-slot PUCCH during BWP adaptation according to the fourth aspect. FIGS. 13A and 13B illustrate a case 1.

In addition, this description has mainly described a case where inter-slot/intra-slot frequency hopping are enabled. However, the embodiments of this description can be used even in a case where frequency hopping is not enabled (for example, FIGS. 13A and 13B correspond to the case where frequency hopping is not enabled).

In this example, PUCCH resources for a BWP 41 and PUCCH resources for a BWP #2 are respectively configured. A plurality of PUCCH resources may be configured, and one of the PUCCH resources may be selected by DCI.

In the example in FIG. 13A, after BWP adaptation, the UE drops PUCCH transmission in PUCCH resources after the adaptation. In the example in FIG. 13B, after BWP adaptation, the UE performs PUCCH transmission in the PUCCH resources after the adaptation.

According to the above-described fourth embodiment, even when BWP adaptation is applied during transmission of the multi-slot PUCCH, it is possible to appropriately decide the PUCCH resources per BWP.

Fifth Embodiment

The fifth embodiment will describe in detail a signaling in a case where frequency hopping is enabled for a PUCCH.

A plurality of sets (PUCCH resource sets or parameter sets) each including 1 or more parameters related to resources for a PUCCH (PUCCH resources) may be configured (or notified from a radio base station) in advance to a UE.

One of a plurality of these PUCCH resource sets is indicated by using a given field in Downlink Control Information (DCI). The UE controls transmission of the PUCCH based on the PUCCH resource set indicated by the given field value in the DCI.

When inter-slot frequency hopping is enabled for the PUCCH, each PUCCH resource set configured by a higher layer signaling may include frequency resource information described in, for example, the first embodiment.

FIGS. 14A and 14B are diagrams illustrating one example of PUCCH resource sets according to the fifth embodiment. As illustrated in FIG. 14A, each value of a given field of DCI indicates a PUCCH resource set. In, for example, FIG. 14A, the given field values "00", "01" "10" and "11" may indicate PUCCH resource sets #0, #1, #2 and #3, respectively.

As illustrated in FIG. 14B, each PUCCH resource set may include at least one of following parameters.
Information indicating a starting symbol of a PUCCH
Information indicating the number of symbols of the PUCCH in a slot
Information (e.g., a starting PRB index) for identifying a frequency resource (e.g., starting PRB) of a first hop of the PUCCH
Information indicating the number of resource units (e.g., the number of PRBs) that compose the frequency resources of the PUCCH
Information indicating whether frequency hopping is enabled or is not enabled (turned on or turned off)
Information related to frequency resources of second and subsequent hops in a case where frequency hopping is enabled (e.g., information indicating at least one of above-described k, M and m, and information indicating indices of respective frequency resources of the second and subsequent hops)
Information (frequency hopping mode) indicating a frequency hopping type (intra-slot and/or inter-slot) to be enabled.

In this regard, at least one parameter illustrated in FIG. 14B may not be dynamically indicated as a PUCCH resource set, and may be semi-statically configured by a higher layer signaling.

The PUCCH resource set may be configured differently per UCI type (HARQ-ACK, CSI or an SR). For example, a PUCCH resource set for CSI (CQI) may be assumed as a PUCCH resource set to which at least one parameter is separately configured among PUCCH resource sets for HARQ-ACK.

FIGS. 15A to 15C are diagrams illustrating one example of frequency offsets according to the fifth embodiment. In this example, an index #n (e.g., minimum index) of a given resource unit (e.g., PRB/RE) of the frequency resource of the first hop is notified to the UE.

When the frequency resource of the PUCCH is hopped per slot as illustrated in FIG. 15A, frequency offset information indicating a frequency offset k from a frequency resource of a previous hop (previous slot) may be notified as information related to frequency resources of second and subsequent hops to the UE.

In FIG. 15A, based on an addition (or subtraction) result of an index #n of the frequency resource of the previous hop (e.g., the frequency resource of the first slot (slot #0)), and the frequency offset k, the UE may determine an index #n+k (or #n−k) of a frequency resource of a next slot (e.g., the frequency resource of the second hop (slot #1)).

In FIG. 15B, frequency offset information indicating a frequency offset $k_i$ of an ith (i=2 to 4) hop from an index #m of a reference frequency resource is notified the LIE, Information indicating the index #m may be notified (configured) by a higher layer signaling.

in FIG. 15B, the UE may determine an index #m+$k_i$ of the frequency resource of the ith hop based on #m and $K_i$.

In FIG. 15C, the frequency offset information indicating the frequency offset k of the ith (i=2 to 4) from an index #1 of an edge of a BWP is notified to the UE. The index #1 may be an index (e.g., the PRB index or the RE index) of an edge of the BWP on a side opposite to a side to which the frequency resource of the first hop belongs.

In FIG. 15C, the UE may determine an index #1+$k_i$ of the frequency resource of the ith hop based on #1 and $k_i$.

A bandwidth in a case where hopping is enabled will be described below. In addition, a "total bandwidth" and/or a "bandwidth" in the following description can be read as a "frequency offset" described above.

When inter-slot hopping is enabled for a multi-slot PUCCH, a total bandwidth of all hops and/or a bandwidth of 1 hop may be notified as a bandwidth of inter-slot hopping to a UE by a higher layer signaling.

When inter-slot hopping is enabled for the multi-slot PUCCH, the UE may derive a bandwidth of inter-slot hopping from the bandwidth of intra-slot hopping. For example, a bandwidth of inter-slot hopping=M*a bandwidth of intra-slot hopping, or the bandwidth of inter-slot hopping=M*m*the bandwidth of intra-slot hopping may hold. (M and m take values described in the second embodiment). In addition, M=1 may be assumed.

The bandwidth of intra-slot hopping may be calculated based on at least one of bandwidths related to a BWP described in the second embodiment, or may be notified by a higher layer signaling, a physical layer signaling or a combination of these signalings.

A subband of frequency hopping may be configured by a higher layer signaling, or may be an integral multiple of an RBG of a UE BWP or a cell BW. Even when intra-slot hopping is configured to be enabled, if the numbers of available symbols in 1 slot is smaller than X (e.g., X=7 or X=4), intra-slot hopping may be interpreted as disabled (or may be ignored).

(Radio Communication System)

The configuration of the radio communication system according to one embodiment of the present disclosure will be described below. This radio communication system uses one or a combination of the radio communication method according to each of the above embodiments of the present disclosure to perform communication.

Figure 16:
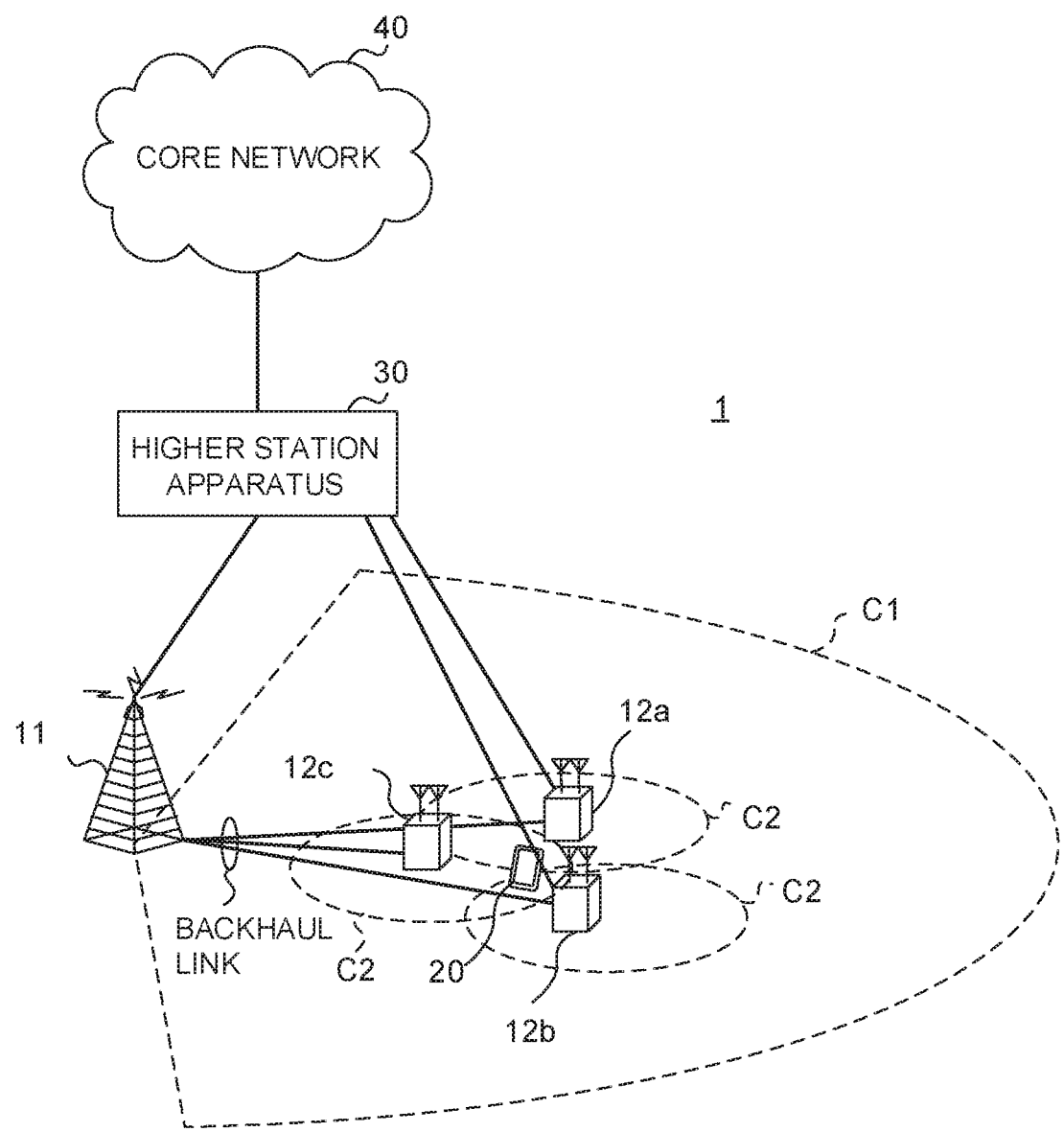
FIG. 16 is a diagram illustrating one example of a schematic configuration of a radio communication system according to one embodiment.

FIG. 16 is a diagram illustrating one example of a schematic configuration of the radio communication system according to the one embodiment. A radio communication system 1 can apply Carrier Aggregation (CA) and/or Dual Connectivity (DC) that aggregate a plurality of base frequency blocks (component carriers) whose 1 unit is a system bandwidth (e.g., 20 MHz) of the LTE system.

In this regard, the radio communication system 1 may be referred to as Long Term Evolution (LTE), LTE-Advanced (LTE-A), LTE-Beyond (LTE-B), SUPER 3G, MIT-Advanced, the 4th generation mobile communication system (4G), the 5th generation mobile communication system (5G), New Radio (NR), Future Radio Access (FRA) and the New Radio Access Technology (New-RAT), or a system that realizes these techniques.

The radio communication system 1 includes a radio base station 11 that forms a macro cell C1 of a relatively wide coverage, and radio base stations 12 (12a to 12c) that are located in the macro cell C1 and form small cells C2 narrower than the macro cell C1. Furthermore, a user terminal 20 is located in the macro cell C1 and each small cell C2. An arrangement and the numbers of respective cells and the user terminals 20 are not limited to the aspect illustrated in FIG. 16.

The user terminal 20 can connect with both of the radio base station 11 and the radio base stations 12. The user terminal 20 is assumed to concurrently use the macro cell C1 and the small cells C2 by using CA or DC. Furthermore, the user terminal 20 can apply CA or DC by using a plurality of cells (CCs).

The user terminal 20 and the radio base station 11 can communicate by using a carrier (also referred to as a legacy carrier) of a narrow bandwidth in a relatively low frequency band (e.g., 2 GHz). On the other hand, the user terminal 20 and each radio base station 12 may use a carrier of a wide bandwidth in a relatively high frequency band (e.g., 3.5 GHz or 5 GHz) or may use the same carrier as that used between the user terminal 20 and the radio base station 11. In this regard, a configuration of the frequency band used by each radio base station is not limited to this.

Furthermore, the user terminal 20 can perform communication by using Time Division Duplex (TDD) and/or Frequency Division Duplex (FDD) in each cell. Furthermore, each cell (carrier) may be applied a single numerology or may be applied a plurality of different numerologies.

The numerology may be a communication parameter to be applied to transmission and/or reception of a certain signal and/or channel, and may indicate at least one of, for example, a sub-carrier spacing, a bandwidth, a symbol length, a cyclic prefix length, a subframe length, a TTI length, the number of symbols per TTI, a radio frame configuration, specific filtering processing performed by a transceiver in a frequency-domain, and specific windowing processing performed by the transceiver in a time-domain. For example, a case where sub-carrier spacings of constituent OFDM symbols are different and/or a case where the numbers of OFDM symbols are different on a certain physical channel may be read as that numerologies are different.

The radio base station 11 and each radio base station 12 (or the two radio base stations 12) may be connected by way of wired connection (e.g., optical fibers compliant with a Common Public Radio interface (CPRI) or an X2 interface) or radio connection.

The radio base station 11 and each radio base station 12 are each connected with a higher station apparatus 30 and connected with a core network 40 via the higher station apparatus 30. In this regard, the higher station apparatus 30 includes, for example, an access gateway apparatus, a Radio Network Controller (RNC) and a Mobility Management Entity (MME), yet is not limited to these. Furthermore, each radio base station 12 may be connected with the higher station apparatus 30 via the radio base station 11.

In this regard, the radio base station 11 is a radio base station that has a relatively wide coverage, and may be referred to as a macro base station, an aggregate node, an eNodeB (eNB) or a transmission/reception point. Furthermore, each radio base station 12 is a radio base station that has a local coverage, and may be referred to as a small base station, a micro base station, a pica base station, a femto base station, a Home eNodeB (HeNB), a Remote Radio Head (RRH) or a transmission/reception point. The radio base stations 11 and 12 will be collectively referred to as a radio base station 10 below when not distinguished.

Each user terminal 20 is a terminal that supports various communication schemes such as LTE and LTE-A, and may include not only a mobile communication terminal (mobile station) but also a fixed communication terminal (fixed station).

The radio communication system 1 applies Orthogonal Frequency-Division Multiple Access (OFDMA) to downlink and applies Single Carrier-Frequency Division Multiple Access (SC-FDMA) and/or OFDMA to uplink as radio access schemes.

OFDMA is a multicarrier transmission scheme that divides a frequency band into a plurality of narrow frequency bands (subcarriers) and maps data on each subcarrier to perform communication. SC-FDMA is a single carrier transmission scheme that divides a system bandwidth into bands including one or contiguous resource blocks per terminal and causes a plurality of terminals to use respectively different bands to reduce an inter-terminal interference. In this regard, uplink and downlink radio access schemes are not limited to a combination of these schemes, and other radio access schemes may be used.

The radio communication system 1 uses a downlink shared channel (PDSCH: Physical Downlink Shared Channel) shared by each user terminal 20, a broadcast channel (PBCH: Physical Broadcast Channel) and a downlink L1/L2 control channel as downlink channels. User data, higher layer control information and a System Information Block (SIB) are conveyed on the PDSCH, Furthermore, a Master Information Block (MIB) is conveyed on the PBCH.

The downlink L1/L2 control channel includes a Physical Downlink Control Channel (PDCCH), an Enhanced Physical Downlink Control Channel (EPDCCH), a Physical Control Format Indicator Channel (PCFICH), and a Physical Hybrid-ARQ Indicator Channel (PHICH). Downlink Control Information (DCI) including scheduling information of the PDSCH and/or the PUSCHI is conveyed on the PDCCH.

In addition, the scheduling information may be notified by the DCI. For example, DCI for scheduling reception of DL data may be referred to as a DL assignment, and DCI for scheduling transmission of UL data may be referred to as a UL grant.

The number of OFDM symbols used for the PDCCH is conveyed on the PCFICH. Transmission acknowledgement information (also referred to as, for example, retransmission control information, HARQ-ACK or ACK/NACK) of a Hybrid Automatic Repeat reQuest (HARQ) for the PUSCH is conveyed on the PHICH. The EPDCCH is subjected to frequency division multiplexing with the PDSCH (downlink shared data channel) and is used to convey DCI similar to the PDCCH.

The radio communication system 1 uses an uplink shared channel (PUSCH: Physical Uplink Shared Channel) shared by each user terminal 20, an uplink control channel (PUCCH: Physical Uplink Control Channel), and a random access channel (PRACH: Physical Random Access Channel) as uplink channels. User data and higher layer control information are conveyed on the PUSCH. Furthermore, downlink radio quality information (CQI: Channel Quality Indicator), transmission acknowledgement information and a Scheduling Request (SR) are conveyed on the PUCCH. A random access preamble for establishing connection with a cell is conveyed on the PRACH.

The radio communication system 1 conveys a Cell-specific Reference Signal (CRS), a Channel State Information-Reference Signal (CSI-RS), a DeModulation Reference Signal (DMRS) and a Positioning Reference Signal (PRS) as downlink reference signals. Furthermore, the radio communication system 1 conveys a Sounding Reference Signal (SRS) and a DeModulation Reference Signal (DMRS) as uplink reference signals. In this regard, the DMRS may be referred to as a user terminal-specific reference signal (UE-specific Reference Signal). Furthermore, a reference signal to be conveyed is not limited to these.

(Radio Base Station)

Figure 17:
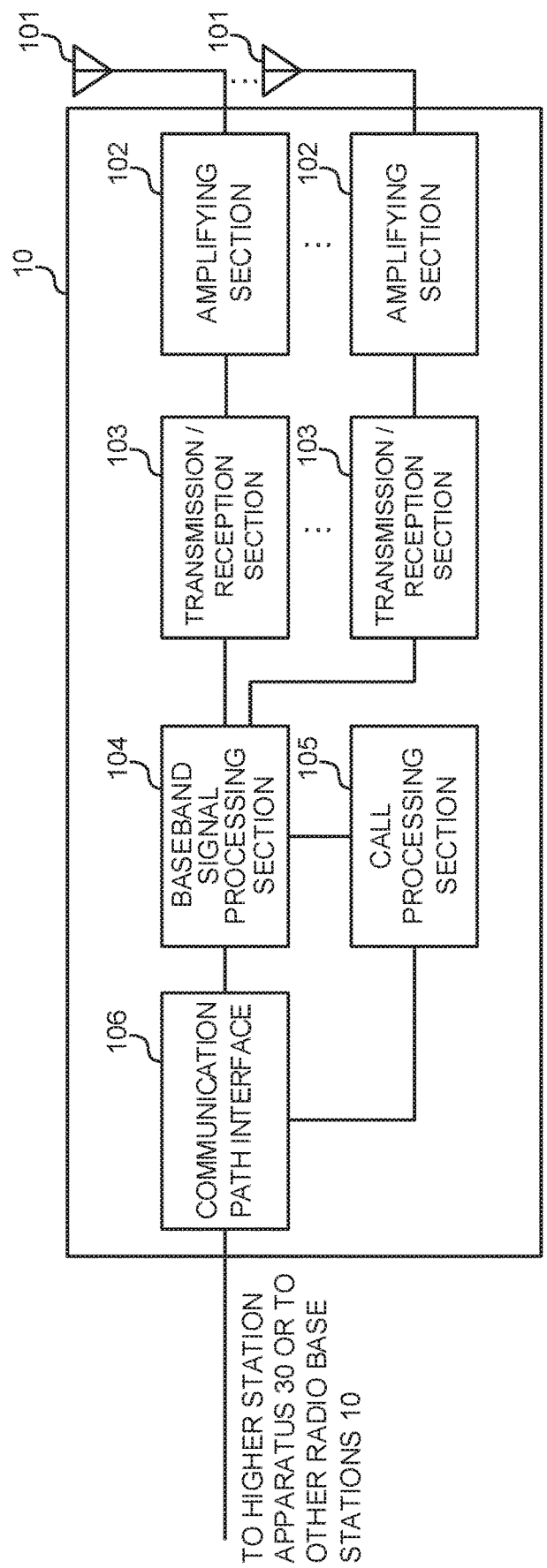
FIG. 17 is a diagram illustrating one example of an overall configuration of a radio base station according to the one embodiment.

FIG. 17 is a diagram illustrating one example of an overall configuration of the radio base station according to the one embodiment. The radio base station 10 includes pluralities of transmission/reception antennas 101, amplifying sections 102 and transmission/reception sections 103, a baseband signal processing section 104, a call processing section 105 and a communication path interface 106. In this regard, the radio base station 10 only needs to be configured to include one or more of each of the transmission/reception antennas 101, the amplifying sections 102 and the transmission/reception sections 103.

User data transmitted from the radio base station 10 to the user terminal 20 on downlink is input from the higher station apparatus 30 to the baseband signal processing section 104 via the communication path interface 106.

The baseband signal processing section 104 performs processing of a Packet Data Convergence Protocol (PDCP) layer, segmentation and concatenation of the user data, transmission processing of a Radio Link Control (RLC) layer such as RLC retransmission control, Medium Access Control (MAC) retransmission control (e.g., HARQ transmission processing), and transmission processing such as scheduling, transmission format selection, channel coding, Inverse Fast Fourier Transform (IFFT) processing, and preceding processing on the user data, and transfers the user data to each transmission/reception section 103. Furthermore, the baseband signal processing section 104 performs transmission processing such as channel coding and inverse fast Fourier transform on a downlink control signal, too, and transfers the downlink control signal to each transmission/reception section 103.

Each transmission/reception section 103 converts a baseband signal precoded and output per antenna from the baseband signal processing section 104 into a radio frequency range, and transmits a radio frequency signal. The radio frequency signal subjected to frequency conversion by each transmission/reception section 103 is amplified by each amplifying section 102, and is transmitted from each transmission/reception antenna 101. The transmission/reception sections 103 can be composed of transmitters/receivers, transmission/reception circuits or transmission/reception apparatuses described based on a common knowledge in a technical field according to the present disclosure. In this regard, the transmission/reception sections 103 may be composed as an integrated transmission/reception section or may be composed of transmission sections and reception sections.

Meanwhile, each amplifying section 102 amplifies a radio frequency signal received by each transmission/reception antenna 101 as an uplink signal. Each transmission/reception section 103 receives the uplink signal amplified by each amplifying section 102. Each transmission/reception section 103 performs frequency conversion on the received signal into a baseband signal, and outputs the baseband signal to the baseband signal processing section 104.

The baseband signal processing section 104 performs Fast Fourier Transform (FITT) processing, Inverse Discrete Fourier Transform (IDFT) processing, error correcting decoding, MAC retransmission control reception processing, and reception processing of an RLC layer and a PDCP layer on user data included in the input uplink signal, and transfers the user data to the higher station apparatus 30 via the communication path interface 106. The call processing section 105 performs call processing (such as configuration and release) of a communication channel, state management of the radio base station 10 and radio resource management.

The communication path interface 106 transmits and receives signals to and from the higher station apparatus 30 via a given interface. Furthermore, the communication path interface 106 may transmit and receive (backhaul signaling) signals to and from the another radio base station 10 via an inter-base station interface (e.g., optical fibers compliant with the Common Public Radio Interface (CPRI) or the X2 interface).

Each transmission/reception section 103 may receive an uplink control channel over multiple slots by using given resources (e.g., PUCCH resources).

Each transmission/reception section 103 may transmit information related to the PUCCH resources to the user terminal 20.

Figure 18:
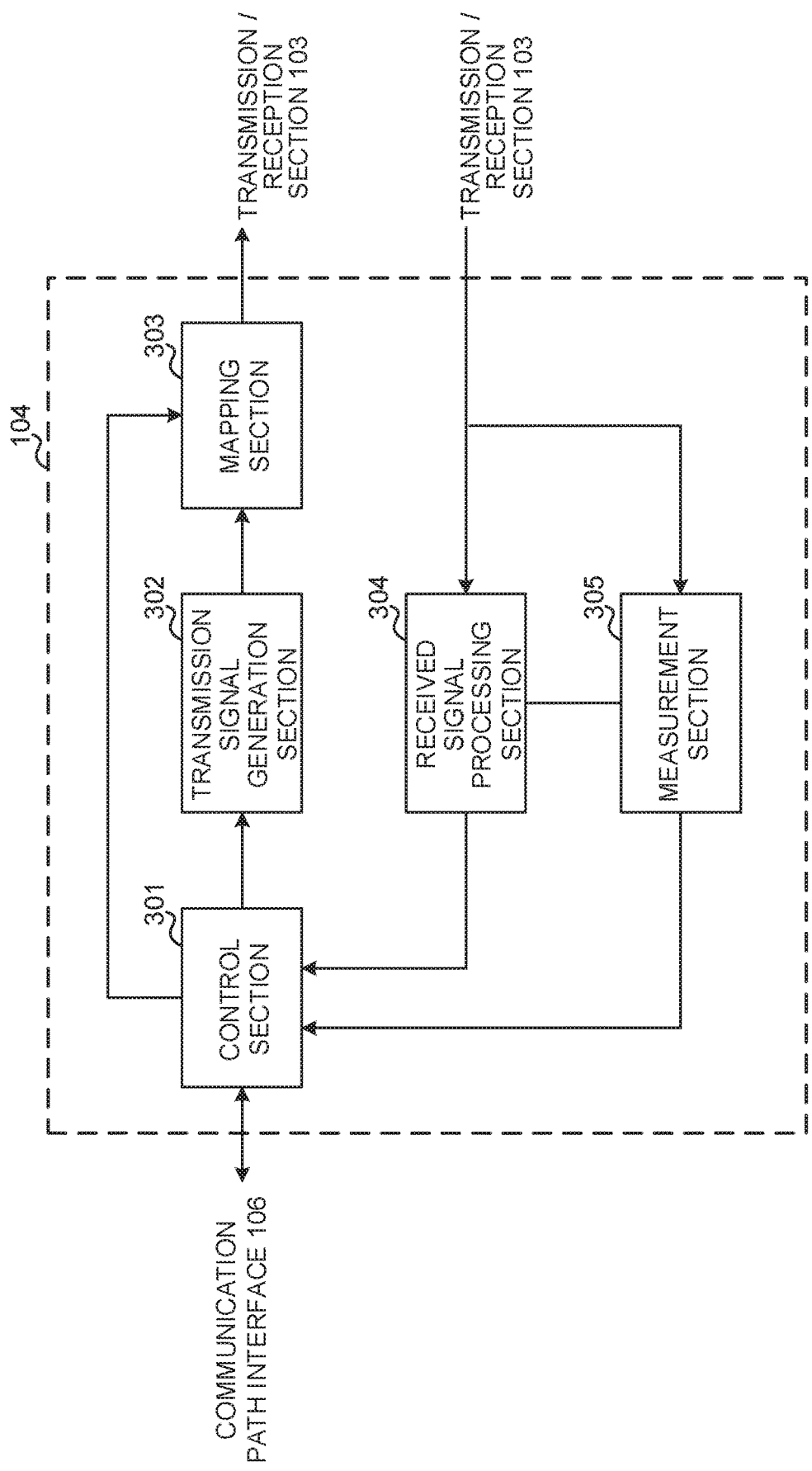
FIG. 18 is a diagram illustrating one example of a function configuration of the radio base station according to the one embodiment.

FIG. 18 is a diagram illustrating one example of a function configuration of the radio base station according to the one embodiment of the present disclosure. In addition, this example mainly illustrates function blocks of characteristic portions according to the present embodiment, and assumes that the radio base station 10 includes other function blocks, too, that are necessary for radio communication.

The baseband signal processing section 104 includes at least a control section (scheduler) 301, a transmission signal generation section 302, a mapping section 303, a received signal processing section 304 and a measurement section 305. In addition, these components only need to be included in the radio base station 10, and part or all of the components may not be included in the baseband signal processing section 104.

The control section (scheduler) 301 controls the entire radio base station 10. The control section 301 can be composed of a controller, a control circuit or a control apparatus described based on the common knowledge in the technical field according to the present disclosure.

The control section 301 controls, for example, signal generation of the transmission signal generation section 302 and signal allocation of the mapping section 303. Furthermore, the control section 301 controls signal reception processing of the received signal processing section 304 and signal measurement of the measurement section 305.

The control section 301 controls scheduling (e.g., resource allocation) of system information, a downlink data signal (e.g., a signal that is transmitted on the PDSCH), and a downlink control signal (e.g., a signal that is transmitted on the PDCCH and/or the EPDCCH and is, for example, transmission acknowledgement information). Furthermore, the control section 301 controls generation of a downlink control signal and a downlink data signal based on a result obtained by deciding whether or not it is necessary to perform retransmission control on an uplink data signal.

The control section 301 controls scheduling of synchronization signals (e.g., a Primary Synchronization Signal (PSS)/a Secondary Synchronization Signal (SSS)) and downlink reference signals (e.g., a CRS, a CSI-RS and a DMRS).

The control section 301 controls scheduling of an uplink data signal (e.g., a signal that is transmitted on the PUSCH), an uplink control signal (e.g., a signal that is transmitted on the PUCCH and/or the PUSCH and is, for example, transmission acknowledgement information), a random access preamble (e.g., a signal that is transmitted on the PRACH) and an uplink reference signal.

The control section 301 may perform control to receive UCI by using the given resources (e.g., PUCCH resources).

The transmission signal generation section 302 generates a downlink signal (such as a downlink control signal, a downlink data signal or a downlink reference signal) based on an instruction from the control section 301, and outputs the downlink signal to the mapping section 303. The transmission signal generation section 302 can be composed of a signal generator, a signal generating circuit or a signal generating apparatus described based on the common knowledge in the technical field according to the present disclosure.

The transmission signal generation section 302 generates, for example, a DL assignment for notifying downlink data allocation information, and/or a UL grant for notifying uplink data allocation information based on the instruction from the control section 301. The DL assignment and the UL grant are both DCI, and conform to a DCI format. Furthermore, the transmission signal generation section 302 performs encoding processing and modulation processing on a downlink data signal according to a code rate and a modulation scheme determined based on Channel State Information (CSI) from each user terminal 20.

The mapping section 303 maps the downlink signal generated by the transmission signal generation section 302, on given radio resources based on the instruction from the control section 301, and outputs the downlink signal to each transmission/reception section 103. The mapping section 303 can be composed of a mapper, a mapping circuit or a mapping apparatus described based on the common knowledge in the technical field according to the present disclosure.

The received signal processing section 304 performs reception processing (e.g., demapping, demodulation and decoding) on a received signal input from each transmission/reception section 103. In this regard, the received signal is, for example, an uplink signal (such as an uplink control signal, an uplink data signal or an uplink reference signal) transmitted from the user terminal 20. The received signal processing section 304 can be composed of a signal processor, a signal processing circuit or a signal processing apparatus described based on the common knowledge in the technical field according to the present disclosure.

The received signal processing section 304 outputs information decoded by the reception processing to the control section 301. When, for example, receiving the PUCCH including HARQ-ACK, the received signal processing section 304 outputs the HARQ-ACK to the control section 301. Furthermore, the received signal processing section 304 outputs the received signal and/or the signal after the reception processing to the measurement section 305.

The measurement section 305 performs measurement related to the received signal. The measurement section 305 can be composed of a measurement instrument, a measurement circuit or a measurement apparatus described based on the common knowledge in the technical field according to the present disclosure.

For example, the measurement section 305 may perform Radio Resource Management (RRM) measurement or Channel State Information (CSI) measurement based on the received signal. The measurement section 305 may measure received power (e.g., Reference Signal Received Power (RSRP)), received quality (e.g., Reference Signal Received Quality (RSRQ), a Signal to Interference plus Noise Ratio (SINR) or a Signal to Noise Ratio (SNR)), a signal strength (e.g., a Received Signal Strength Indicator (RSSI)) or channel information (e.g., CSI). The measurement section 305 may output a measurement result to the control section 301.

(User Terminal)

Figure 19:
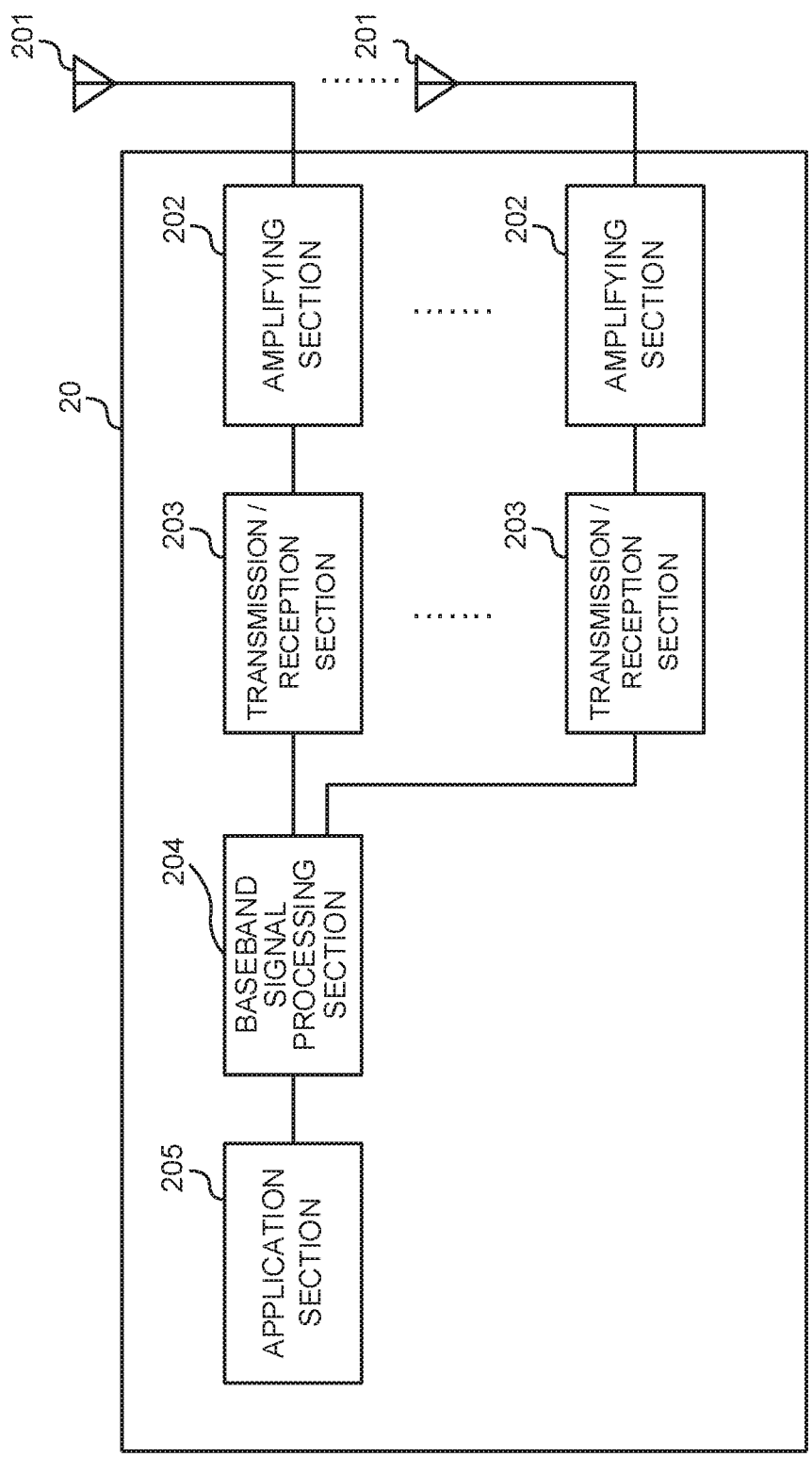
FIG. 19 is a diagram illustrating one example of an overall configuration of a user terminal according to the one embodiment.

FIG. 19 is a diagram illustrating one example of an overall configuration of the user terminal according to the one embodiment. The user terminal 20 includes pluralities of transmission/reception antennas 201, amplifying sections 202 and transmission/reception sections 203, a baseband signal processing section 204 and an application section 205. In this regard, the user terminal 20 only needs to be configured to include one or more of each of the transmission/reception antennas 201, the amplifying sections 202 and the transmission/reception sections 203.

Each amplifying section 202 amplifies a radio frequency signal received at each transmission/reception antenna 201. Each transmission/reception section 203 receives a downlink signal amplified by each amplifying section 202. Each transmission/reception section 203 performs frequency conversion on the received signal into a baseband signal, and outputs the baseband signal to the baseband signal processing section 204. The transmission/reception sections 203 can be composed of transmitters/receivers, transmission/reception circuits or transmission/reception apparatuses described based on the common knowledge in the technical field according to the present disclosure. In this regard, the transmission/reception sections 203 may be composed as an integrated transmission/reception section or may be composed of transmission sections and reception sections.

The baseband signal processing section 204 performs FFT processing, error correcting decoding and retransmission control reception processing on the input baseband signal. The baseband signal processing section 204 transfers downlink user data to the application section 205. The application section 205 performs processing related to layers higher than a physical layer and an MAC layer. Furthermore, the baseband signal processing section 204 may transfer broadcast information of the downlink data, too, to the application section 205.

On the other hand, the application section 205 inputs uplink user data to the baseband signal processing section 204. The baseband signal processing section 204 performs retransmission control transmission processing (e.g., HARQ transmission processing), channel coding, precoding, Discrete Fourier Transform (DFT) processing and IFFT processing on the uplink user data, and transfers the uplink user data to each transmission/reception section 203.

Each transmission/reception section 203 converts the baseband signal output from the baseband signal processing section 204 into a radio frequency range, and transmits a radio frequency signal. The radio frequency signal subjected to the frequency conversion by each transmission/reception section 203 is amplified by each amplifying section 202, and is transmitted from each transmission/reception antenna 201.

Each transmission/reception section 203 may transmit an uplink control channel over multiple slots by using given resources (e.g., PUCCH resources).

Each transmission/reception section 203 may receive information related to the PUCCH resources from the radio base station 10.

Figure 20:
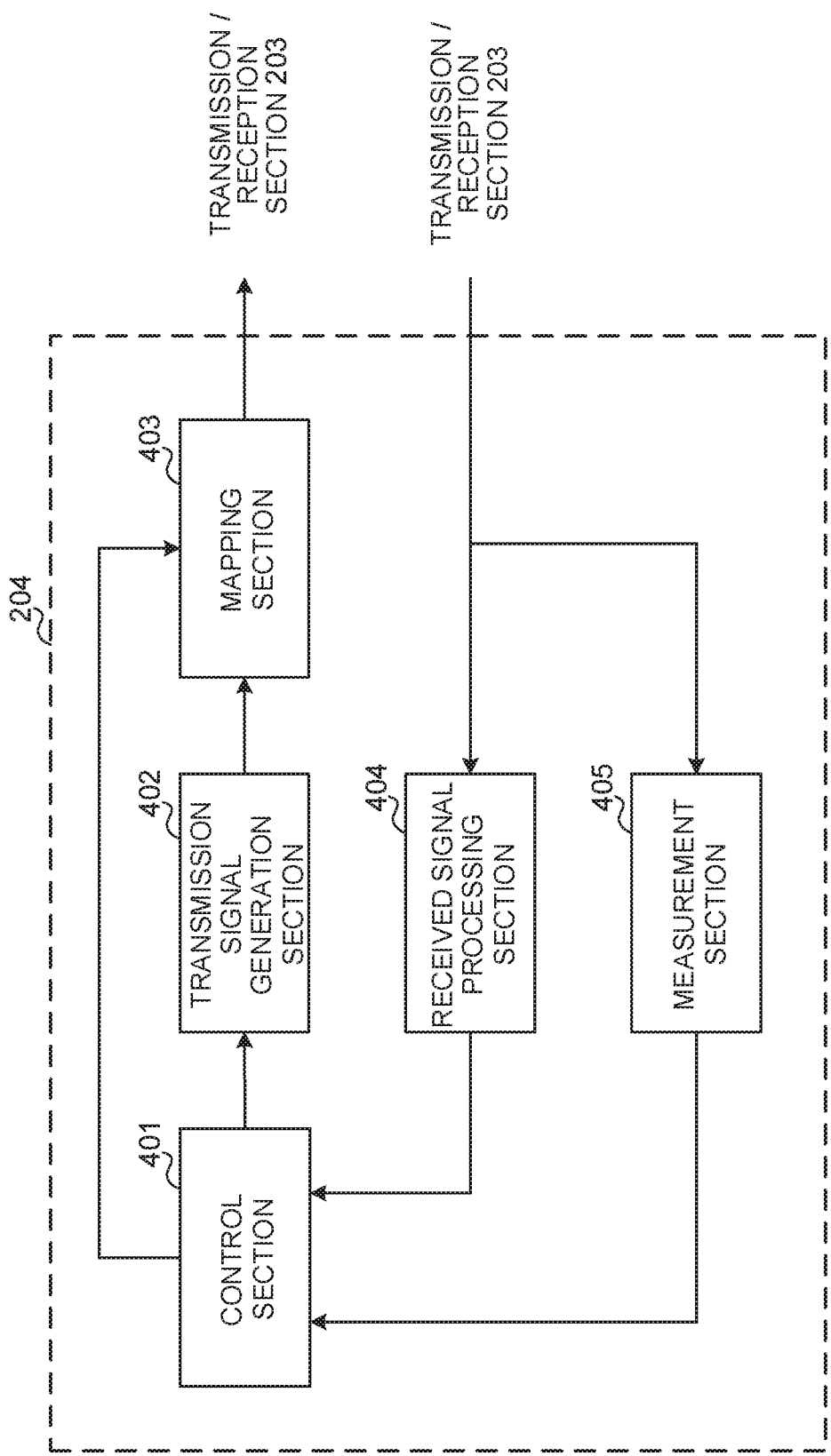
FIG. 20 is a diagram illustrating one example of a function configuration of the user terminal according to the one embodiment.

FIG. 20 is a diagram illustrating one example of a function configuration of the user terminal according to the one embodiment. In addition, this example mainly illustrates function blocks of characteristic portions according to the present embodiment, and assumes that the user terminal 20 includes other function blocks, too, that are necessary for radio communication.

The baseband signal processing section 204 of the user terminal 20 includes at least a control section 401, a transmission signal generation section 402, a mapping section 403, a received signal processing section 404 and a measurement section 405. In addition, these components only need to be included in the user terminal 20, and part or all of the components may not be included in the baseband signal processing section 204.

The control section 401 controls the entire user terminal 20. The control section 401 can be composed of a controller, a control circuit or a control apparatus described based on the common knowledge in the technical field according to the present disclosure.

The control section 401 controls, for example, signal generation of the transmission signal generation section 402 and signal allocation of the mapping section 403. Furthermore, the control section 401 controls signal reception processing of the received signal processing section 404 and signal measurement of the measurement section 405.

The control section 401 obtains from the received signal processing section 404 a downlink control signal and a downlink data signal transmitted from the radio base station 10. The control section 401 controls generation of an uplink control signal and/or an uplink data signal based on a result obtained by deciding whether or not it is necessary to perform retransmission control on the downlink control signal and/or the downlink data signal.

When changing an active Bandwidth Part (BWP) (applying BWP adaptation) during transmission of an uplink control channel (multi-slot PUCCH) over multiple slots, the control section 401 may control transmission of the multi-slot PUCCH after the BWP changing.

The control section 401 may perform control to drop transmission of the uplink control channel after the BWP changing.

When frequency hopping is enabled for the multi-slot PUCCH, the control section 401 may decide a frequency offset of a second hop from a frequency offset of a first hop, based on an active BWP (i.e., a pre-change BWP before the BWP changing, and a post-change BWP after the BWP changing).

The control section 401 may decide a start position of multi-slot PUCCH resource indices based on the active BWP. The control section 401 may decide the multi-slot PUCCH resources based on information (e.g., PUCCH resource set) configured to the active BWP among multi-slot PUCCH configuration information (e.g., PUCCH resource set) configured per BWP.

When obtaining from the received signal processing section 404 various pieces of information notified from the radio base station 10, the control section 401 may update parameters used for control based on the various pieces of information.

The transmission signal generation section 402 generates an uplink signal (such as an uplink control signal, an uplink data signal or an uplink reference signal) based on an instruction from the control section 401, and outputs the uplink signal to the mapping section 403. The transmission signal generation section 402 can be composed of a signal generator, a signal generating circuit or a signal generating apparatus described based on the common knowledge in the technical field according to the present disclosure.

The transmission signal generation section 402 generates an uplink control signal related to transmission acknowledgement information and Channel State Information (CSI) based on, for example, the instruction from the control section 401. Furthermore, the transmission signal generation section 402 generates an uplink data signal based on the instruction from the control section 401. When, for example, the downlink control signal notified from the radio base station 10 includes a UL grant, the transmission signal generation section 402 is instructed by the control section 401 to generate an uplink data signal.

The mapping section 403 maps the uplink signal generated by the transmission signal generation section 402, on radio resources based on the instruction from the control section 401, and outputs the uplink signal to each transmission/reception section 203. The mapping section 403 can be composed of a mapper, a mapping circuit or a mapping apparatus described based on the common knowledge in the technical field according to the present disclosure.

The received signal processing section 404 performs reception processing (e.g., demapping, demodulation and decoding) on the received signal input from each transmission/reception section 203. In this regard, the received signal is, for example, a downlink signal (such as a downlink control signal, a downlink data signal or a downlink reference signal) transmitted from the radio base station 10. The received signal processing section 404 can be composed of a signal processor, a signal processing circuit or a signal processing apparatus described based on the common knowledge in the technical field according to the present disclosure. Furthermore, the received signal processing section 404 can compose the reception section according to the present disclosure.

The received signal processing section 404 outputs information decoded by the reception processing to the control section 401. The received signal processing section 404 outputs, for example, broadcast information, system information, an RRC signaling and DCI to the control section 401. Furthermore, the received signal processing section 404 outputs the received signal and/or the signal after the reception processing to the measurement section 405.

The measurement section 405 performs measurement related to the received signal. The measurement section 405 can be composed of a measurement instrument, a measurement circuit or a measurement apparatus described based on the common knowledge in the technical field according to the present disclosure.

For example, the measurement section 405 may perform RRM measurement or CSI measurement based on the received signal. The measurement section 405 may measure received power (e.g., RSRP), received quality (e.g., RSRQ, an SINR or an SNR), a signal strength (e.g., RSSI) or channel information (e.g., CSI). The measurement section 405 may output a measurement result to the control section 401.

(Hardware Configuration)

In addition, the block diagrams used to describe the above embodiments illustrate blocks in function units. These function blocks (components) are realized by an optional combination of hardware and/or software. Furthermore, a method for realizing each function block is not limited in particular. That is, each function block may be realized by using one physically and/or logically coupled apparatus or may be realized by using a plurality of these apparatuses formed by connecting two or more physically and/or logically separate apparatuses directly and/or indirectly (by using, for example, wired connection and/or radio connection).

Figure 21:
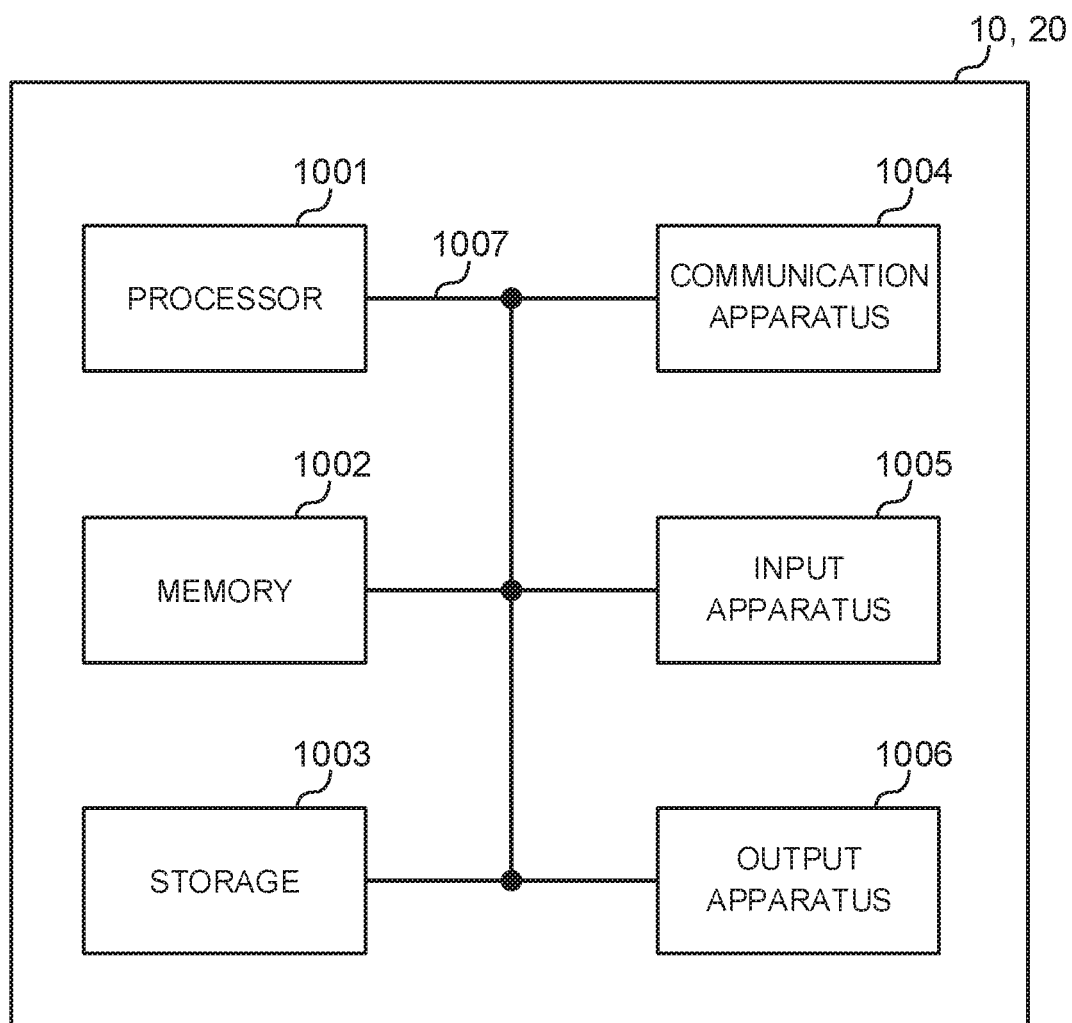
FIG. 21 is a diagram illustrating one example of hardware configurations of the radio base station and the user terminal according to the one embodiment.

For example, the radio base station and the user terminal according to the one embodiment of the present disclosure may function as computers that perform processing of the radio communication method according to the present disclosure. FIG. 21 is a diagram illustrating one example of the hardware configurations of the radio base station and the user terminal according to the one embodiment. The above-described radio base station 10 and user terminal 20 may be each physically configured as a computer apparatus that includes a processor 1001, a memory 1002, a storage 1003, a communication apparatus 1004, an input apparatus 1005, an output apparatus 1006 and a bus 1007.

In this regard, a word "apparatus" in the following description can be read as a circuit, a device or a unit. The hardware configurations of the radio base station 10 and the user terminal 20 may be configured to include one or a plurality of apparatuses illustrated in FIG. 21 or may be configured without including part of the apparatuses.

For example, FIG. 21 illustrates the only one processor 1001. However, there may be a plurality of processors. Furthermore, processing may be executed by 1 processor or processing may be executed by 1 or more processors concurrently or successively or by using another method. In addition, the processor 1001 may be implemented by 1 or more chips.

Each function of the radio base station 10 and the user terminal 20 is realized by, for example, causing hardware such as the processor 1001 and the memory 1002 to read given software (program), and thereby causing the processor 1001 to perform an operation, and control communication via the communication apparatus 1004 and control reading and/or writing of data in the memory 1002 and the storage 1003.

The processor 1001 causes, for example, an operating system to operate to control the entire computer. The processor 1001 may be composed of a Central Processing Unit (CPU) including an interface for a peripheral apparatus, a control apparatus, an operation apparatus and a register. For example, the above-described baseband signal processing section 104 (204) and call processing section 105 may be realized by the processor 1001.

Furthermore, the processor 1001 reads programs (program codes), a software module or data from the storage 1003 and/or the communication apparatus 1004 out to the memory 1002, and executes various types of processing according to these programs, software module or data. As the programs, programs that cause the computer to execute at least part of the operations described in the above-described embodiments are used. For example, the control section 401 of the user terminal 20 may be realized by a control program that is stored in the memory 1002 and operates on the processor 1001, and other function blocks may be also realized likewise.

The memory 1002 is a computer-readable recording medium, and may be composed of at least one of, for example, a Read Only Memory (ROM), an Erasable Programmable ROM (EPROM), an Electrically EPROM (EEPROM), a Random Access Memory (RAM) and other appropriate storage media. The memory 1002 may be referred to as a register, a cache or a main memory (main storage apparatus). The memory 1002 can store programs (program codes) and a software module that can be executed to perform the radio communication method according to the one embodiment.

The storage 1003 is a computer-readable recording medium, and may be composed of at least one of, for example, a flexible disk, a floppy (registered trademark) disk, a magnetooptical disk (e.g., a compact disk (Compact Disc ROM (CD-ROM)), a digital versatile disk and a Blu-ray (registered trademark) disk), a removable disk, a hard disk drive, a smart card, a flash memory device (e.g., a card, a stick or a key drive), a magnetic stripe, a database, a server and other appropriate storage media. The storage 1003 may be referred to as an auxiliary storage apparatus.

The communication apparatus 1004 is hardware (transmission/reception device) that performs communication between computers via wired and/or radio networks, and will be also referred to as, for example, a network device, a network controller, a network card and a communication module. The communication apparatus 1004 may be configured to include a high frequency switch, a duplexer, a filter and a frequency synthesizer to realize, for example, Frequency Division Duplex (FDD) and/or Time Division Duplex (TDD). For example, the above-described transmission/reception antennas 101 (201), amplifying sections 102 (202), transmission/reception sections 103 (203) and communication path interface 106 may be realized by the communication apparatus 1004.

The input apparatus 1005 is an input device (e.g., a keyboard, a mouse, a microphone, a switch, a button or a sensor) that accepts an input from an outside. The output apparatus 1006 is an output device (e.g., a display, a speaker or a Light Emitting Diode (LED) lamp) that sends an output to the outside. In addition, the input apparatus 1005 and the output apparatus 1006 may be an integrated component (e.g., touch panel).

Furthermore, each apparatus such as the processor 1001 or the memory 1002 is connected by the bus 1007 that communicates information. The bus 1007 may be composed by using a single bus or may be composed by using different buses between apparatuses.

Furthermore, the radio base station 10 and the user terminal 20 may be configured to include hardware such as a microprocessor, a Digital Signal Processor (DSP), an Application Specific Integrated Circuit (ASIC), a Programmable Logic Device (PLD) and a Field Programmable Gate Array (FPGA). The hardware may be used to realize part or all of each function block. For example, the processor 1001 may be implemented by using at least one of these types of hardware.

MODIFIED EXAMPLE

In addition, each term that has been described in this description and/or each term that is necessary to understand this description may be replaced with terms having identical or similar meanings. For example, a channel and/or a symbol may be signals (signalings). Furthermore, a signal may be a message. A reference signal can be also abbreviated as an RS (Reference Signal), or may be also referred to as a pilot or a pilot signal depending on standards to be applied. Furthermore, a Component Carrier (CC) may be referred to as a cell, a frequency carrier and a carrier frequency.

Furthermore, a radio frame may include one or a plurality of durations (frames) in a time-domain. Each of one or a plurality of durations (frames) that composes a radio frame may be referred to as a subframe. Furthermore, the subframe may include one or a plurality of slots in the time-domain. The subframe may be a fixed time duration (e.g., 1 ms) that does not depend on the numerologies.

Furthermore, the slot may include one or a plurality of symbols (Orthogonal Frequency Division Multiplexing (OFDM) symbols or Single Carrier-Frequency Division Multiple Access (SC-FDMA) symbols) in the time-domain. Furthermore, the slot may be a time unit based on the numerologies. Furthermore, the slot may include a plurality of mini slots. Each mini slot may include one or a plurality of symbols in the time-domain. Furthermore, the mini slot may be referred to as a sub slot.

The radio frame, the subframe, the slot, the mini slot and the symbol each indicate a time unit for conveying signals. The other corresponding names may be used for the radio frame, the subframe, the slot, the mini slot and the symbol. For example, 1 subframe may be referred to as a Transmission Time Interval (TTI), a plurality of contiguous subframes may be referred to as TTIs, or 1 slot or 1 mini slot may be referred to as a TTI. That is, the subframe and/or the TTI may be a subframe (1 ms) according to legacy LTE, may be a duration (e.g., 1 to 13 symbols) shorter than 1 ms or may be a duration longer than 1 ms. In addition, a unit that indicates the TTI may be referred to as a slot or a mini slot instead of a subframe.

In this regard, the TTI refers to, for example, a minimum time unit of scheduling for radio communication. For example, in the LTE system, the radio base station performs scheduling for allocating radio resources (a frequency bandwidth or transmission power that can be used in each user terminal) in TTI units to each user terminal. In this regard, a definition of the TTI is not limited to this.

The TTI may be a transmission time unit of a channel-coded data packet (transport block), code block and/or codeword, or may be a processing unit of scheduling or link adaptation. In addition, when the TTI is given, a time period (e.g., the number of symbols) in which a transport block, a code block and/or a codeword are actually mapped may be shorter than the TTI.

In addition, when 1 slot or 1 mini slot is referred to as a TTI, 1 or more TTIs (i.e., 1 or more slots or 1 or more mini slots) may be a minimum time unit of scheduling. Furthermore, the number of slots (the number of mini slots) that compose a minimum time unit of the scheduling may be controlled.

The TTI having the time duration of 1 ms may be referred to as a general TTI (TTIs according to LTE Rel. 8 to 12), a normal TTI, a long TTI, a general subframe, a normal subframe or a long subframe. A TTI shorter than the general TTI may be referred to as a reduced TTI, a short TTI, a partial or fractional TTI, a reduced subframe, a short subframe, a mini slot or a subslot.

In addition, the long TTI (e.g., the general TTI or the subframe) may be read as a TTI having a time duration exceeding 1 ms, and the short TTI (e.g., the reduced TTI) may be read as a TTI having a TTI length less than the TTI length of the long TTI and equal to or more than 1 ms.

A Resource Block (RB) is a resource allocation unit of the time-domain and the frequency-domain, and may include one or a plurality of contiguous subcarriers in the frequency-domain. Furthermore, the RB may include one or a plurality of symbols in the time-domain or may have the length of 1 slot, 1 mini slot, 1 subframe or 1 TTL 1 TTI or 1 subframe may each include one or a plurality of resource blocks. In this regard, one or a plurality of RBs may be referred to as a Physical Resource Block (PRB: Physical RB), a Sub-Carrier Group (SCG), a Resource Element Group (REG), a PRB pair or an RB pair.

Furthermore, the resource block may include one or a plurality of Resource Elements (REs). For example, 1 RE may be a radio resource domain of 1 subcarrier and 1 symbol.

In this regard, structures of the above-described radio frame, subframe, slot, mini slot and symbol are only exemplary structures. For example, configurations such as the number of subframes included in a radio frame, the number of slots per subframe or radio frame, the number of mini slots included in a slot, the numbers of symbols and RBs included in a slot or a mini slot, the number of subcarriers included in an RB, the number of symbols in a TTI, a symbol length and a Cyclic Prefix (CP) length can be variously changed.

Furthermore, the information and parameters described in this description may be expressed by using absolute values, may be expressed by using relative values with respect to given values or may be expressed by using other corresponding information. For example, a radio resource may be instructed by a given index.

Names used for parameters in this description are in no respect restrictive names. For example, various channels (the Physical Uplink Control Channel (PUCCH) and the Physical Downlink Control Channel (PDCCH)) and information elements can be identified based on various suitable names. Therefore, various names assigned to these various channels and information elements are in no respect restrictive names.

The information and the signals described in this description may be expressed by using one of various different techniques. For example, the data, the instructions, the commands, the information, the signals, the bits, the symbols and the chips mentioned in the above entire description may be expressed as voltages, currents, electromagnetic waves, magnetic fields or magnetic particles, optical fields or photons, or optional combinations of these.

Furthermore, the information and the signals can be output from a higher layer to a lower layer and/or from the lower layer to the higher layer. The information and the signals may be input and output via a plurality of network nodes.

The input and output information and signals may be stored in a specific location (e.g., memory) or may be managed by using a management table. The information and signals to be input and output can be overwritten, updated or additionally written. The output information and signals may be deleted. The input information and signals may be transmitted to other apparatuses.

Notification of information is not limited to the aspect/embodiments described in this description and may be performed by using other methods. For example, the information may be notified by a physical layer signaling (e.g., Downlink Control Information (DCI) and Uplink Control Information (UCI)), a higher layer signaling (e.g., a Radio Resource Control (RRC) signaling, broadcast information (a Master Information Block (MM) and a System Information Block (SIB)), and a Medium Access Control (MAC) signaling), other signals or combinations of these.

In addition, the physical layer signaling may be referred to as Layer 1/Layer 2 (L1/L2) control information (L1/L2 control signal) or L1 control information (L1 control signal). Furthermore, the RRC signaling may be referred to as an RRC message, and may be, for example, an RRCConnectionSetup message or an RRCConnectionReconfiguration message. Furthermore, the MAC signaling may be notified by using, for example, an MAC Control Element (MAC CE).

Furthermore, notification of given information (e.g., notification of "being X") is not limited to explicit notification, and may be performed implicitly (by, for example, not notifying this given information or by notifying another information).

Decision may be made based on a value (0 or 1) expressed as 1 bit, may be made based on a boolean expressed as true or false or may be made by comparing numerical values (by, for example, making comparison with a given value).

Irrespectively of whether software is referred to as software, firmware, middleware, a microcode or a hardware description language or is referred to as other names, the software should be widely interpreted to mean a command, a command set, a code, a code segment, a program code, a program, a subprogram, a software module, an application, a software application, a software package, a routine, a subroutine, an object, an executable file, an execution thread, a procedure or a function.

Furthermore, software, commands and information may be transmitted and received via transmission media. When, for example, the software is transmitted from websites, servers or other remote sources by using wired techniques (e.g., coaxial cables, optical fiber cables, twisted pairs and Digital Subscriber Lines (DSLs)) and/or radio techniques (e.g., infrared rays and microwaves), these wired techniques and/or radio techniques are included in a definition of the transmission media.

The terms "system" and "network" used in this description are compatibly used.

In this description, the terms "Base Station (BS)", "radio base station", "eNB", "gNB", "cell", "sector", "cell group", "carrier" and "component carrier" can be compatibly used. The base station will be also referred to as a term such as a fixed station, a NodeB, an eNodeB (eNB), an access point, a transmission point, a reception point, a femtocell or a small cell in some cases.

The base station can accommodate one or a plurality of (e.g., three) cells (also referred to as sectors). When the base station accommodates a plurality of cells, an entire coverage area of the base station can be partitioned into a plurality of smaller areas. Each smaller area can also provide communication service via a base station subsystem (e.g., indoor small base station (RRH: Remote Radio Head)). The term "cell" or "sector" indicates part or the entirety of the coverage area of the base station and/or the base station subsystem that provide communication service in this coverage.

In this description, the terms "Mobile Station (MS)", "user terminal", "User Equipment (UE)" and "terminal" can be compatibly used.

The mobile station will be also referred to by a person skilled in the art as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client or some other appropriate terms in some cases.

Furthermore, the radio base station in this description may be read as the user terminal. For example, each aspect/embodiment of the present disclosure may be applied to a configuration where communication between the radio base station and the user terminal is replaced with communication between a plurality of user terminals (D2D: Device-to-Device). In this case, the user terminal 20 may be configured to include the functions of the above-described radio base station 10. Furthermore, words such as "uplink" and "downlink" may be read as a "side". For example, the uplink channel may be read as a side channel.

Similarly, the user terminal in this description may be read as the radio base station. In this case, the radio base station 10 may be configured to include the functions of the above-described user terminal 20.

In this description, operations performed by the base station are performed by an upper node of this base station depending on cases. Obviously, in a network including one or a plurality of network nodes including the base stations, various operations performed to communicate with a terminal can be performed by base stations, one or more network nodes (that are supposed to be, for example, Mobility Management Entities (MMES) or Serving-Gateways (S-GWs) yet are not limited to these) other than the base stations or a combination of these.

Each aspect/embodiment described in this description may be used alone, may be used in combination or may be switched and used when carried out. Furthermore, orders of the processing procedures, the sequences and the flowchart according to each aspect/embodiment described in this description may be rearranged unless contradictions arise. For example, the method described in this description presents various step elements in an exemplary order and is not limited to the presented specific order.

Each aspect/embodiment described in this description may be applied to Long Term Evolution (LTE), LTE-Advanced (LTE-A), LTE-Beyond (LTE-B), SUPER 3G, IMT-Advanced, the 4th generation mobile communication system (4G), the 5th generation mobile communication system (5G), Future Radio Access (FRA), the New Radio Access Technology (New-RAT), New Radio (NR), New radio access (NX), Future generation radio access (FX), Global System for Mobile communications (GSM) (registered trademark), CDMA2000, Ultra Mobile Broadband (LIMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other appropriate radio communication methods and/or next-generation systems that are expanded based on these systems.

The phrase "based on" used in this description does not mean "based only on" unless specified otherwise. In other words, the phrase "based on" means both of "based only on" and "based at least on".

Every reference to elements that use names such as "first" and "second" used in this description does not generally limit the quantity or the order of these elements. These names can be used in this description as a convenient method for distinguishing between two or more elements. Hence, the reference to the first and second elements does not mean that only two elements can be employed or the first element should precede the second element in some way.

The term "deciding (determining)" used in this description includes diverse operations in some cases. For example, "deciding (determining)" may be regarded to "decide (determine)" calculating, computing, processing, deriving, investigating, looking up (e.g., looking up in a table, a database or another data structure) and ascertaining. Furthermore, "deciding (determining)" may be regarded to "decide (determine)" receiving (e.g., receiving information), transmitting (e.g., transmitting information), input, output and accessing (e.g., accessing data in a memory). Furthermore, "deciding (determining)" may be regarded to "decide (determine)" resolving, selecting, choosing, establishing and comparing. That is, "deciding (determining)" may be regarded to "decide (determine)" some operation.

The words "connected" and "coupled" used in this description or every modification of these words can mean every direct or indirect connection or coupling between 2 or more elements, and can include that 1 or more intermediate elements exist between the two elements "connected" or "coupled" with each other. The elements may be coupled or connected physically or logically or by a combination of the physical and logical connections. For example, "connection" may be read as "access".

It can be understood in this description that, when connected, the two elements are "connected" or "coupled" with each other by using 1 or more electric wires, cables and/or printed electrical connection, and by using electromagnetic energy having wavelengths in radio frequency domains, microwave domains and/or (both of visible and invisible) light domains in some non-restrictive and non-comprehensive examples.

A sentence that "A and B are different" in this description may mean that "A and B are different from each other". Words such as "separate" and "coupled" may be also interpreted in a similar manner.

When the words "including" and "comprising" and modifications of these words are used in this description or the claims, these words intend to be comprehensive similar to the word "having". Furthermore, the word "or" used in this description or the claims intends not to be an exclusive OR.

The invention according to the present disclosure has been described in detail above. However, it is obvious for a person skilled in the art that the invention according to the present disclosure is not limited to the embodiments described in this description. The invention according to the present disclosure can be carried out as modified and changed aspects without departing from the gist and the scope of the invention defined based on the recitation of the claims. Accordingly, the disclosure of this description is intended for exemplary explanation, and does not bring any restrictive meaning to the invention according to the present disclosure.

The invention claimed is:

1. A terminal comprising:
 a transmission section that transmits an uplink control channel over multiple slots; and
 a control section that, when an active Bandwidth Part (BWP) has changed after a timer expires, performs a control to not transmit the uplink control channel in frequency resources at positions greater than or equal to a first threshold and less than or equal to a second threshold.

2. A radio communication method of a terminal comprising:
 transmitting an uplink control channel over multiple slots; and
 when an active Bandwidth Part (BWP) has changed after a timer expires, performing a control to not transmit the uplink control channel in frequency resources at positions greater than or equal to a first threshold and less than or equal to a second threshold.

3. A base station comprising:
 a receiving section that receives an uplink control channel over multiple slots,
 wherein, when an active Bandwidth Part (BWP) has changed after a timer expires, the receiving section does not receive the uplink control channel in frequency resources at positions greater than or equal to a first threshold and less than or equal to a second threshold.

4. A system comprising a base station and a terminal, wherein:
 the base station comprises:
  a receiving section that receives an uplink control channel over multiple slots, and
 the terminal comprises:
  a transmission section that transmits the uplink control channel over multiple slots; and
  a control section that, when an active Bandwidth Part (BWP) has changed after a timer expires, performs a control to not transmit the uplink control channel in frequency resources at positions greater than or equal to a first threshold and less than or equal to a second threshold.

* * * * *